United States Patent
Hamanaka et al.

(10) Patent No.: US 7,128,861 B2
(45) Date of Patent: Oct. 31, 2006

(54) METHOD FOR PRODUCING HOLLOW YARN FILM

(75) Inventors: Katsuhiko Hamanaka, Fuji (JP); Tetsuo Shimizu, Fuji (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 190 days.

(21) Appl. No.: 10/275,440

(22) PCT Filed: Mar. 5, 2002

(86) PCT No.: PCT/JP02/02034

§ 371 (c)(1),
(2), (4) Date: Nov. 6, 2002

(87) PCT Pub. No.: WO02/070115

PCT Pub. Date: Sep. 12, 2002

(65) Prior Publication Data

US 2003/0107150 A1     Jun. 12, 2003

(30) Foreign Application Priority Data

Mar. 6, 2001  (JP) .............................. 2001-062532
Jan. 8, 2002  (JP) .............................. 2002-001006

(51) Int. Cl.
| | |
|---|---|
| *D01F 1/08* | (2006.01) |
| *D01D 5/16* | (2006.01) |
| *D01D 5/247* | (2006.01) |
| *D01D 5/08* | (2006.01) |
| *B01D 63/02* | (2006.01) |
| *B01D 69/08* | (2006.01) |
| *B29C 55/22* | (2006.01) |
| *B29C 55/06* | (2006.01) |
| *B29C 55/00* | (2006.01) |
| *D01F 6/12* | (2006.01) |

(52) U.S. Cl. ...................... 264/171.26; 264/173.13; 264/173.15; 264/177.17; 264/49; 210/500.23; 428/34.9

(58) Field of Classification Search ................. 264/41, 264/173.13, 49, 173.15, 171.26, 177.17; 210/636, 645, 500.23, 652, 321.78–321.8; 428/398

See application file for complete search history.

(56) References Cited

U.S. PATENT DOCUMENTS 3,642,668 A *   2/1972   Bailey et al. ................. 521/61

(Continued)

FOREIGN PATENT DOCUMENTS

EP      0 378 441 A2      7/1990

(Continued)

OTHER PUBLICATIONS

English translation of Example 18 in JP-11-319522 A, Nov. 24, 1999.

Primary Examiner—Christina Johnson
Assistant Examiner—Matthew J. Daniels
(74) Attorney, Agent, or Firm—Birch, Stewart, Kolasch & Birch, LLP

(57) ABSTRACT

In a method for producing hollow fiber membranes which comprises melt kneading a mixture comprising polyvinylidene fluoride and an organic liquid or a mixture comprising polyvinylidene fluoride, an organic liquid and an inorganic fine powder, extruding the kneaded mixture to form hollow fibers, and extracting the organic liquid or the organic liquid and the inorganic fine powder from the hollow fibers, which includes the steps of drawing the hollow fibers before or after termination of the extraction and then shrinking the fibers. According to this method, it is possible to stably produce hollow fiber membranes having dense pores and having a high water permeation performance, excellent endurance and stain resistance, and which are suitable for filtration uses such as removal of turbidity of water.

10 Claims, 11 Drawing Sheets

U.S. PATENT DOCUMENTS

| | | | |
|---|---|---|---|
| 4,237,083 A | * 12/1980 | Young et al. | 264/41 |
| 4,238,571 A | * 12/1980 | Mano et al. | 521/62 |
| 4,399,035 A | * 8/1983 | Nohmi et al. | 210/500.23 |
| 4,613,441 A | * 9/1986 | Kohno et al. | 210/550.36 |
| 4,675,213 A | * 6/1987 | Yamamori et al. | 427/244 |
| 4,806,291 A | * 2/1989 | Susa | 264/41 |
| 4,812,269 A | * 3/1989 | Harttig et al. | 264/41 |
| 4,842,741 A | * 6/1989 | Coughlin et al. | 210/500.36 |
| 5,022,990 A | * 6/1991 | Doi et al. | 210/500.42 |
| 5,489,406 A | * 2/1996 | Beck et al. | 264/41 |
| 5,626,805 A | * 5/1997 | Meguro et al. | 264/41 |
| 5,736,051 A | * 4/1998 | Degen et al. | 210/650 |
| 5,817,272 A | * 10/1998 | Frey et al. | 264/413 |
| 6,074,718 A | * 6/2000 | Puglia et al. | 428/36.5 |
| 6,177,181 B1 | * 1/2001 | Hamada et al. | 428/304.4 |
| 6,299,773 B1 | 10/2001 | Takamura et al. | |

FOREIGN PATENT DOCUMENTS

| | | |
|---|---|---|
| EP | 1 010 457 A1 | 6/2000 |
| EP | 1 088 792 A1 | 4/2001 |
| JP | 55-99926 A | 7/1980 |
| JP | 61-233026 A | 10/1986 |
| JP | 01 224 005 A | 9/1989 |
| JP | 01-224005 A | 9/1989 |
| JP | 1-228503 A | 9/1989 |
| JP | 3-42025 A | 2/1991 |
| JP | 5-57155 A | 3/1993 |
| JP | 06 246 139 A | 9/1994 |
| JP | 11-262638 A | 9/1999 |
| JP | 11-319522 A | 11/1999 |
| WO | WO 98/38029 A1 | 9/1998 |
| WO | WO 99/47593 A1 | 9/1999 |
| WO | WO 00/63122 A1 | 10/2000 |
| WO | WO 02/04101 A1 | 1/2002 |

* cited by examiner

430 μm 3.0 μm 3.0 μm 3.0 μm

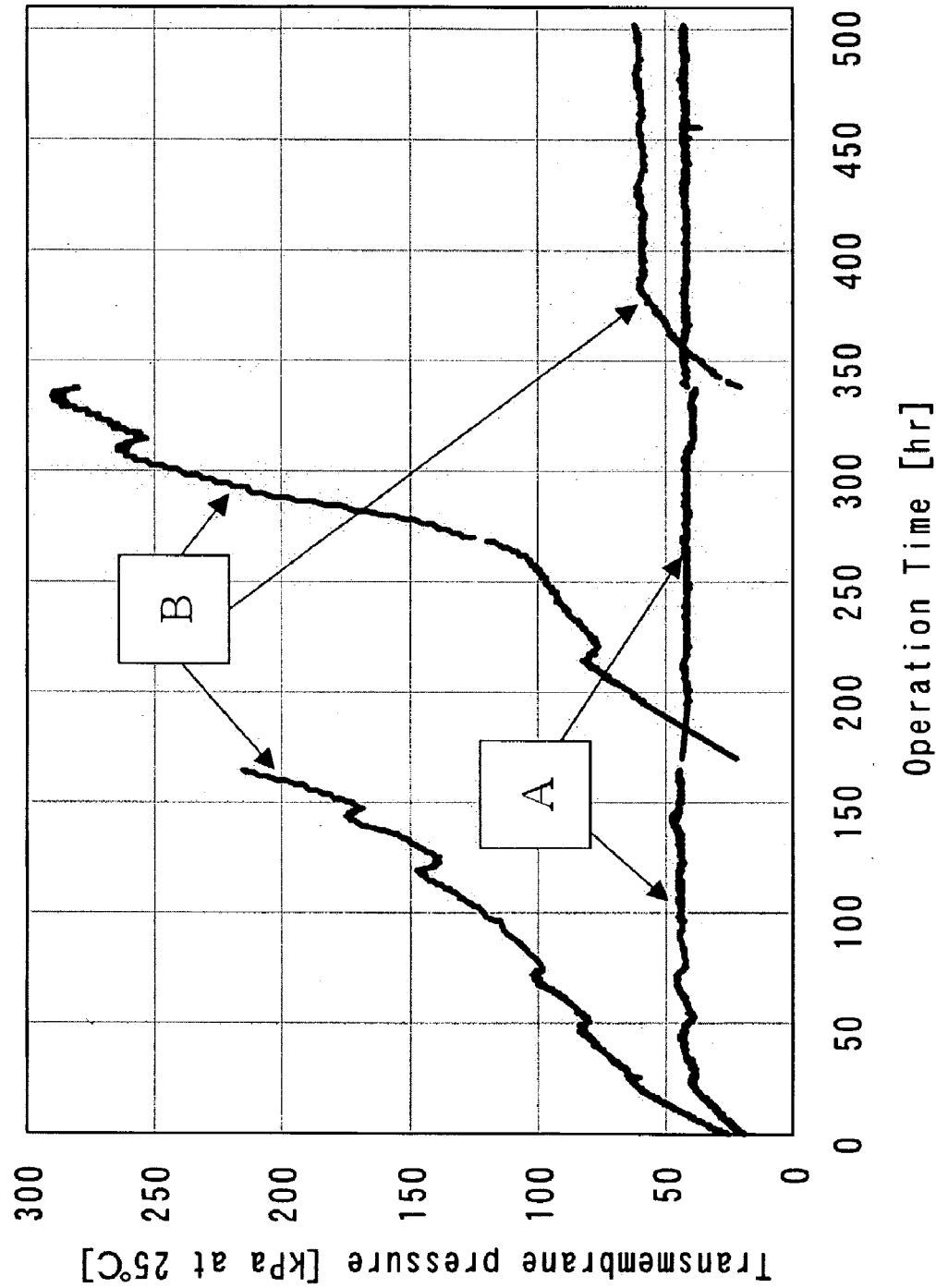

METHOD FOR PRODUCING HOLLOW YARN FILM

This application is the national phase under 35 U.S.C. § 371 of PCT International Application No. PCT/JP02/02034 which has an International filing date of Mar. 5, 2002, which designated the United States of America.

TECHNICAL FIELD

The present invention relates to polyvinylidene fluoride hollow fiber membranes and a method for producing the same. More particularly, it relates to polyvinylidene fluoride hollow fiber membranes which have dense pores and a high water permeation performance, are excellent in endurance and stain resistance, and are suitable for uses in filtration fields such as removal of turbidity of water, and a method for producing the same.

BACKGROUND ART

The filtration operations such as removal of bacteria and turbidity particles using porous membranes such as microfiltration membranes and ultrafiltration membranes are put to practical uses in a wide variety of fields such as the automotive industry (systems for recovery and reuse of electrodeposited paints), semiconductor industry (production of ultra-pure water), and medicine and food industries (removal of bacteria, enzyme purification). Particularly, application to the field of water supply in which potable water and industrial water are prepared by removing the turbidity of river water, etc. and application to the field of sewage in which sewage purification is carried out by removing the turbidity of sewage (secondarily treated sewage) have recently been intensively attempted. In order that the membranes are widely employed in these fields, they are required to be inhibited from staining (clogging) with organic substances, etc.

As materials of the membranes, there are used various materials such as cellulosic materials, polyacrylonitrile-based materials, and polyolefinic materials. Among them, polyvinylidene fluoride is high in strength and heat resistance, and, furthermore, is high in water resistance because its skeleton is hydrophobic and, thus, is suitable as materials of water filtration membranes and is therefore expected to be useful.

As a method for producing polyvinylidene fluoride membranes, U.S. Pat. No. 5,022,990 proposes a method for producing hollow fiber membranes which comprises melt kneading polyvinylidene fluoride, an organic liquid and an inorganic powder, then causing micro-phase separation by cooling and extracting the organic liquid and the inorganic powder. Moreover, WO91/172204 discloses a method for producing hollow fiber membranes comprising polyvinylidene fluoride and a solvent system.

In general, it is known that when filtration of raw water containing turbidity components in large amounts is continued, deposits remaining on the surface of the membranes or in the inside of the membranes which have not been filtered off result in a new filtration resistance to cause deterioration of filtration performance. Therefore, there are employed such means as flushing method according to which the filtration is suspended and the deposits are stripped off by a high speed water stream during the filtration operation, air scrubbing method according to which the deposits are stripped off by applying bubbles to the membrane, back washing method according to which the membranes are washed by reversing the direction of filtration, and the like. Another method is to carry out a periodical cleaning with chemicals to maintain the filtration performance at a high level. The flushing method and air scrubbing method are high in cleaning effect of membranes, but they apply a great load to membranes, which is apt to cause rupture of the membranes, and, furthermore, in the case of conventional membranes, even if these cleaning method are employed, considerable stains are deposited on the membranes (clogging of the membranes) with lapse of time. Thus, satisfactory water permeation performance has not necessarily been obtained.

The object of the present invention is to provide a method for stably and satisfactorily producing polyvinylidene fluoride hollow fiber membranes which have dense pores and high water permeation performance and are excellent in endurance and stain resistance, and are suitable for filtration uses such as removal of turbidity.

DISCLOSURE OF INVENTION

That is, the present invention is directed to the following inventions (1)–(11).

(1) A method for producing hollow fiber membranes which comprises melt kneading a mixture comprising polyvinylidene fluoride and an organic liquid or a mixture comprising polyvinylidene fluoride, an organic liquid and an inorganic fine powder, extruding the kneaded mixture to form hollow fibers, and extracting the organic liquid or the organic liquid and the inorganic fine powder from the hollow fibers, wherein the method includes the steps of drawing the hollow fibers before termination of the extraction or drawing the hollow fibers after termination of the extraction and then shrinking the fibers.

(2) A method of the above (1) which includes the steps of drawing the hollow fibers before termination of the extraction and then shrinking the fibers.

(3) A method of the above (1) wherein the hollow fibers after drawing are shrunk so that the shrinkage of fiber length with respect to the increment of fiber length given by the drawing is in the range of not less than 0.3 and not more than 0.9.

(4) A method of the above (1) wherein the hollow fibers are subjected to a heat treatment at not lower than 100° C. and not higher than 160° C. after the steps of drawing and subsequent shrinking.

(5) A method of the above (1) wherein the drawing is carried out by a take-off machine comprising a pair of opposed infinite track type belts, the takeoff machine is provided on the upstream side and the downstream side of the drawing, the hollow fibers are interposed between the opposed belts and both the belts are moved at the same speed in the same direction to carry the fibers in each of the take-off machines, and the fiber carrying speed in the take-off machine of the downstream side is higher than the fiber carrying speed in the take-off machine of the upstream side.

(6) A method of the above (1) wherein the mixture comprises polyvinylidene fluoride, an organic liquid and an inorganic fine powder.

(7) A method of the above (6) wherein the steps of drawing and then shrinking are carried out before the extraction of the organic liquid and before the extraction of the inorganic fine powder.

(8) A method of the above (6) wherein the steps of drawing and then shrinking are carried out after the extraction of the organic liquid and before the extraction of the inorganic fine powder.

(9) A method of the above (1) wherein the hollow fibers are crimped during the shrinking step.

(10) A method of the above (1) which includes the step of impregnating the hollow fibers after termination of the extraction with an ethylene-vinyl alcohol copolymer solution containing an ethylene-vinyl alcohol copolymer and a solvent which is inert for polyvinylidene fluoride and dissolves the ethylene-vinyl alcohol copolymer and the step of drying the hollow fibers to remove the solvent therefrom.

(11) Hollow fiber membranes obtained by the method described in any one of the above (1)–(10).

BRIEF DESCRIPTION OF DRAWINGS

FIG. 1A is an electron photomicrograph of the outer surface, FIG. 1B is that of the section of the membrane (the whole section), FIG. 1C is that of the section of the membrane, and FIG. 1D is that of the inner surface. In FIG. 1A and FIG. 1D, the top and bottom direction of the photograph is the same as the direction of the fiber length.

FIG. 2A is an electron photomicrograph of the outer surface, FIG. 2B is that of the section of the membrane, and FIG. 2C is that of the inner surface. In FIG. 2A and FIG. 2C, the top and bottom direction of the photograph is the same as the direction of the fiber length.

FIG. 3 is a graph which shows the test results on filtration performance for river water in Example 2 and Comparative Example 1.

BEST MODE FOR CARRYING OUT THE INVENTION

Figure 1A:
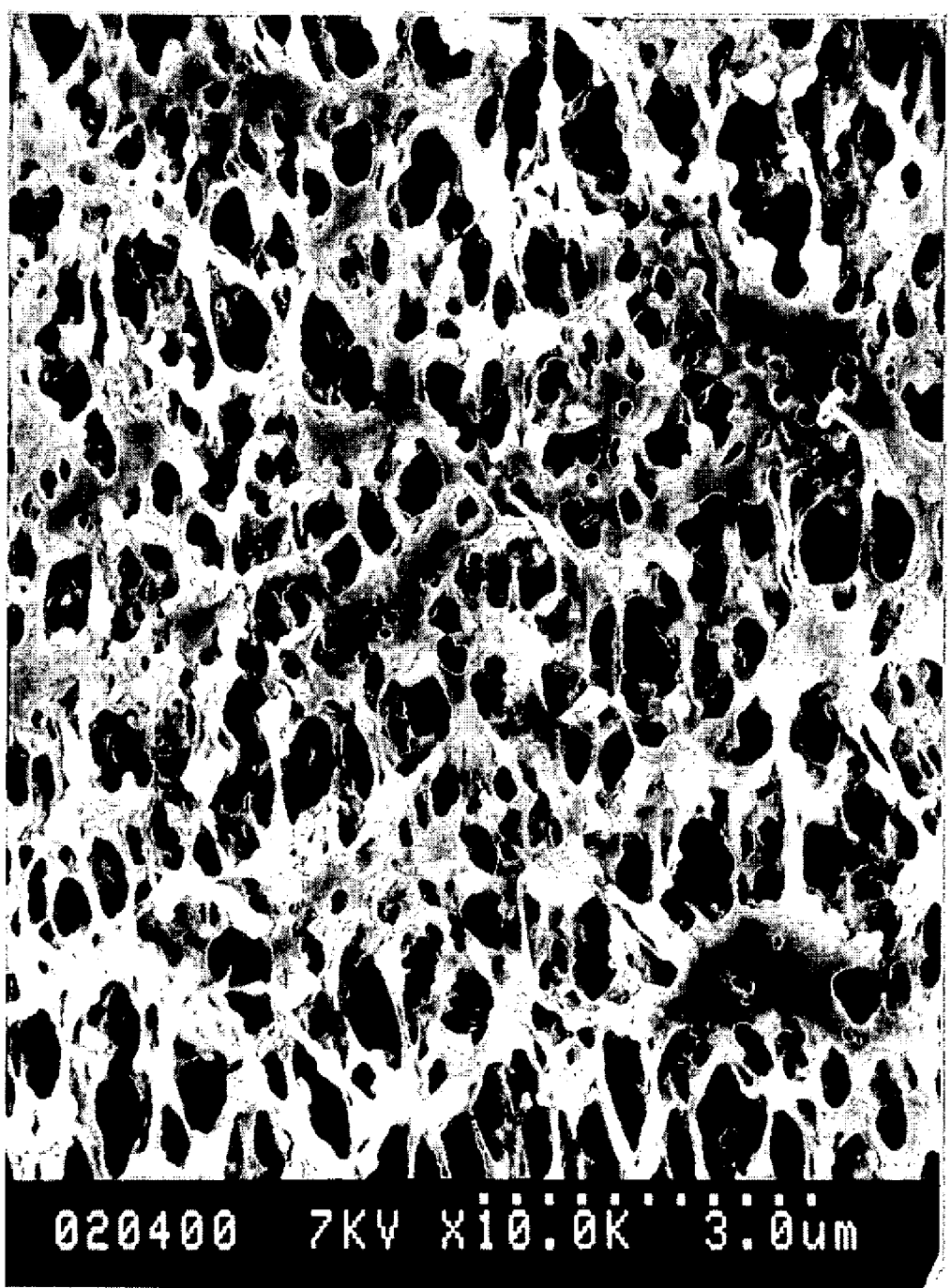
FIGS. 1A–1D show electron photomicrographs of the membrane produced in Example 3.
Figure 1B:
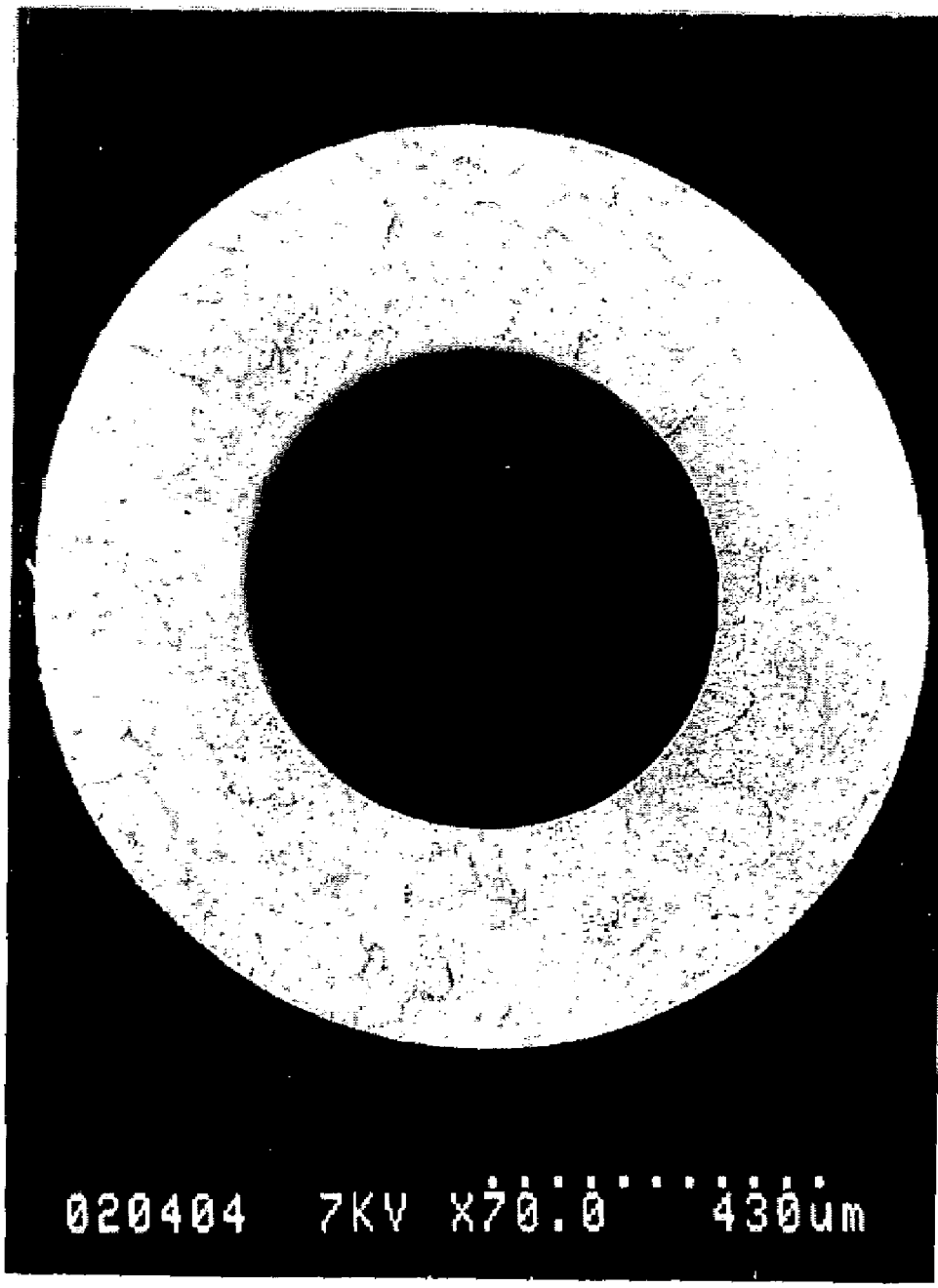
Figure 1C:
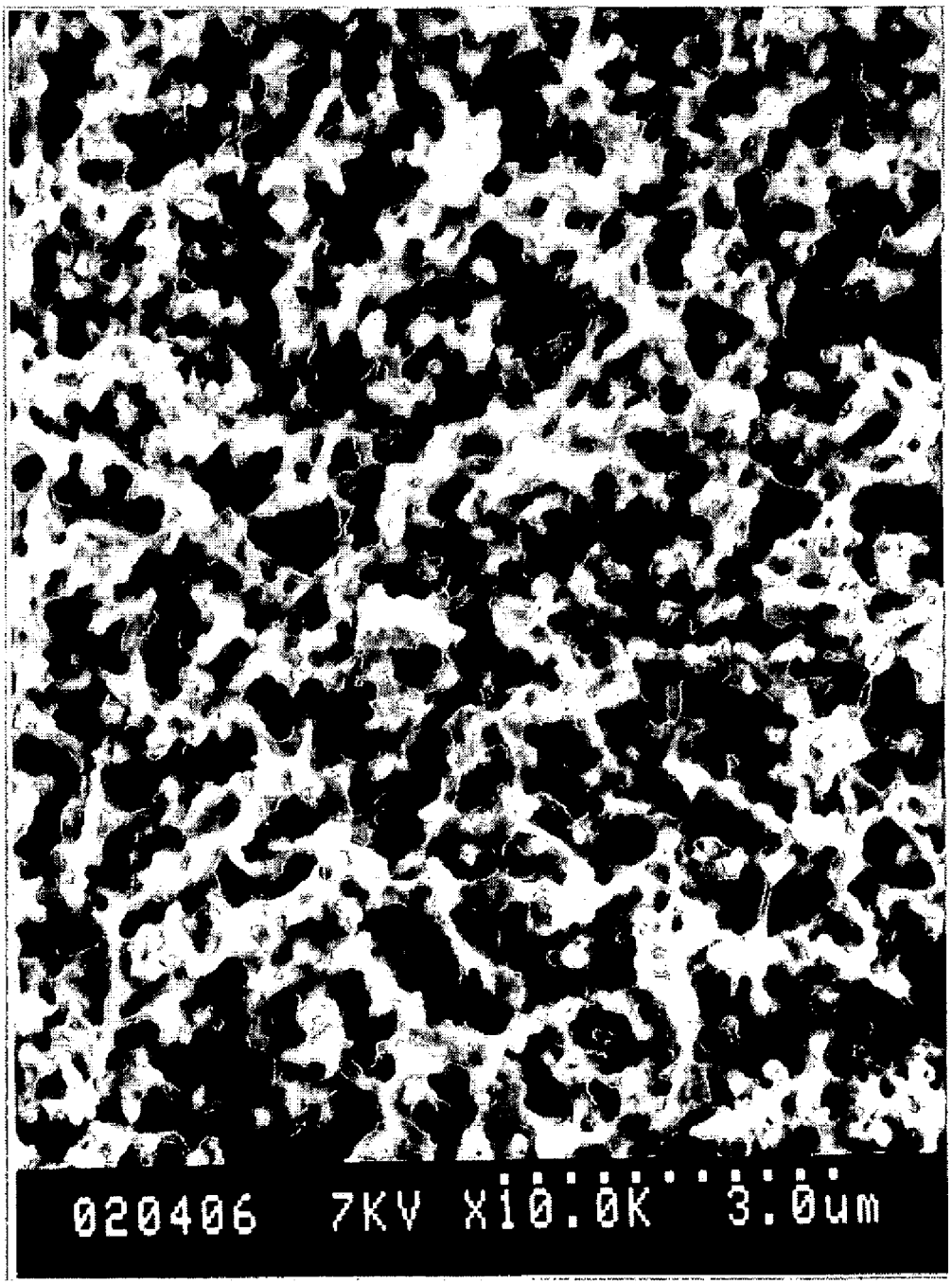
Figure 1D:
Figure 2A:
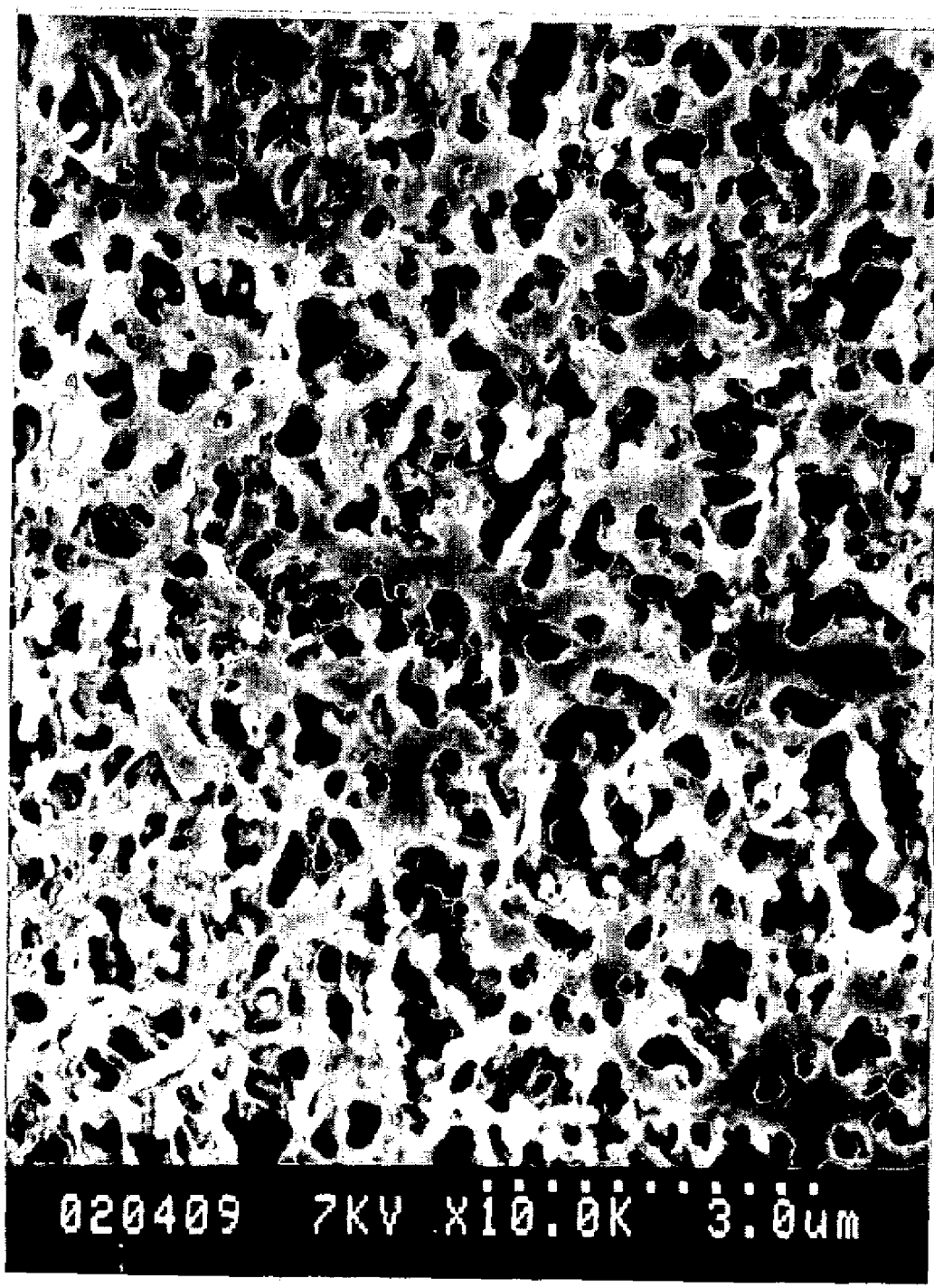
FIGS. 2A–2C show electron photomicrographs of the membrane produced in Comparative Example 1.
Figure 2B:
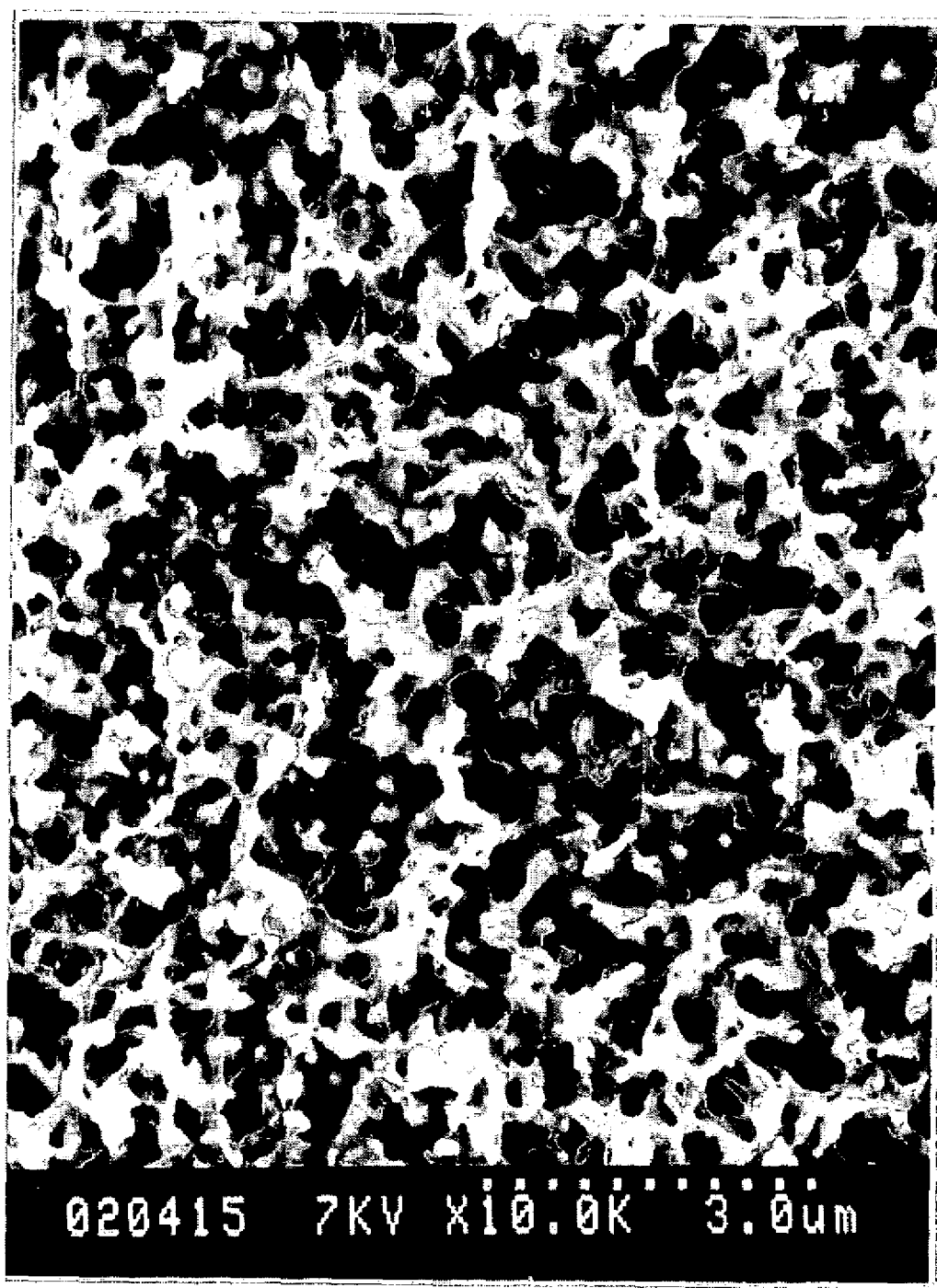
Figure 2C:
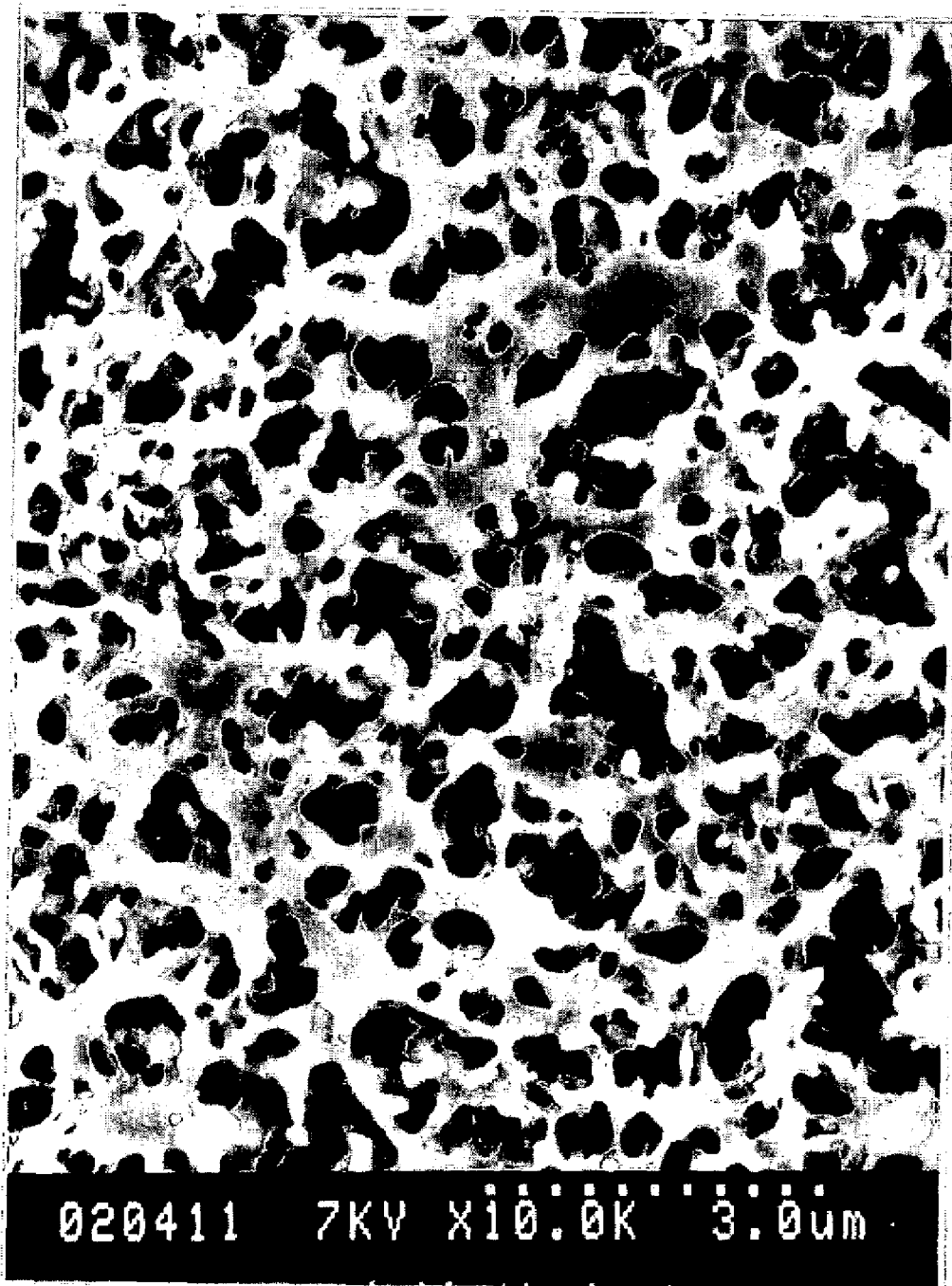

The present invention will be explained in detail below.

The present invention is directed to a method for producing hollow fiber membranes which comprises melt kneading a mixture comprising polyvinylidene fluoride and an organic liquid or a mixture comprising polyvinylidene fluoride, an organic liquid and an inorganic fine powder, extruding the product to form hollow fibers, and extracting the organic liquid or the organic liquid and the inorganic fine powder from the hollow fibers, characterized by including a step of drawing, in the direction of fiber length, the hollow fibers before termination of the extraction or drawing the hollow fibers after termination of the extraction and a subsequent step of shrinking the fibers in the direction of fiber length.

The porous membranes of the present invention have the form of hollow fiber membranes. The hollow fiber membranes are advantageous in that the area of packed membranes per unit volume can be made greater than that of flat membranes or sheet membranes when they are made to a form for actual use (module), and the filtration capability per volume can be enhanced.

Polyvinylidene fluoride is high in strength and heat resistance, and, further, high in water resistance because the skeleton is hydrophobic, and, hence, it is suitable as a material in the present invention. The polyvinylidene fluoride used in the present invention includes a vinylidene fluoride homopolymer and a vinylidene fluoride copolymer. As examples of the vinylidene fluoride copolymer, mention may be made of copolymers of vinylidene fluoride with at least one monomer selected from the group consisting of ethylene tetrafluoride, propylene hexafluoride, ethylene trifluorochloride and ethylene. In the present invention, a vinylidene fluoride homopolymer is preferred. These polymers may be used each alone or in admixture of two or more.

The weight-average molecular weight Mw of the polyvinylidene fluoride is preferably not less than 100,000 and less than 1,000,000. If the Mw of polyvinylidene fluoride is less than 100,000, the resulting hollow fiber membranes are small in elongation and brittle, and cannot be practically used, and if the Mw is 1,000,000 or more, fluidity in the molten state is low, resulting in deterioration of moldability.

If necessary, the raw material polyvinylidene fluoride may contain a small amount of a stabilizer such as an antioxidant, ultraviolet absorber, or the like.

The organic liquid in the present invention means a liquid having a boiling point of not lower than 150° C. The organic liquid is extracted from the hollow fibers to make the resulting hollow fiber membranes porous. It is preferred that the organic liquid is incompatible with polyvinylidene fluoride at low temperature (room temperature) while it is compatible with polyvinylidene fluoride during melt molding (high temperature).

The organic liquid used in the present invention preferably has a solubility parameter (SP: $\delta$) in the range of 15–21 $(MPa)^{1/2}$. In the present invention, the range of SP is more preferably 18–19 $(MPa)^{1/2}$.

Examples of the organic liquid having an SP of 15–21 $(MPa)^{1/2}$ used in the present invention are phthalic acid esters such as diethyl phthalate (DEP), dibutyl phthalate (DBP) and dioctyl phthalate (DOP), phosphoric acid esters, etc. Among them, especially preferred are dioctyl phthalate ($\delta$=18.3 $(MPa)^{1/2}$ (dispersion component $\delta_D$=16.6, polar component $\delta_P$=7.0, hydrogen bond component $\delta_H$=3.1), dibutyl phthalate ($\delta$=20.2 $(MPa)^{1/2}$ ($\delta_D$=17.8, $\delta_P$=8.6, $\delta_H$=4.1)(J. BRANDRUP and E. H. IMMERGUT, POLYMER HANDBOOK THIRD EDITION, page VII-542, 1989), and a mixture of them, but the present invention is not limited to these examples. Dioctyl phthalate is a general term for compounds in which the carbon number in each of the two ester portions is 8, and includes, for example, di-2-ethylhexyl phthalate.

In the case of mixing two or more organic liquids, for example, when SP of an organic liquid (A) is indicated by $\delta(A)$, and dispersion component, polar component and hydrogen bond component of $\delta(A)$ are indicated by $\delta_D(A)$, $\delta_P(A)$ and $\delta_H(A)$, respectively, and when SP of an organic liquid (B) is indicated by $\delta(B)$, and dispersion component, polar component and hydrogen bond component of $\delta(B)$ are indicated by $\delta_D(B)$, $\delta_P(B)$ and $\delta_H(B)$, respectively, $\delta(C)$ which is an SP of a mixture (C) obtained by mixing the organic liquids (A) and (B) at a ratio of m:n can be determined by obtaining firstly dispersion component $\delta_D(C)$, polar component $\delta_P(C)$ and hydrogen bond component $\delta_H(C)$ of the $\delta(C)$ according to the following formulas.

$$\delta_D(C)=\{m\delta_D(A)+n\delta_D(B)\}/(m+n)$$

$$\delta_P(C)=\{m\delta_P(A)+n\delta_P(B)\}/(m+n)$$

$$\delta_H(C)=\{m\delta_H(A)+n\delta_H(B)\}/(m+n)$$

$$\delta(C)=[\{\delta_D(C)\}^2+\{\delta_P(C)\}^2+\{\delta_H(C)\}^2]^{1/2}$$

Furthermore, in the case of mixing two or more organic liquids, it is also preferred that SP of each of them is in the range of 15–21 $(MPa)^{1/2}$, but this range does not limit the present invention.

In the present invention, it is preferred to produce the hollow fiber membranes from a mixture comprising the three components of polyvinylidene fluoride, an organic liquid and an inorganic fine powder. The inorganic fine powder has a function as a carrier which carries the organic liquid, and further has a function as a nucleus for micro-phase separation. That is, the inorganic fine powder inhibits separation of the organic liquid during melt kneading and molding of the mixture to make the molding easier, and acts as a nucleus for the micro-separation to highly micro-disperse the organic liquid and to inhibit flocculation of the organic liquid. The inorganic fine powder is preferably hydrophobic silica. The hydrophobic silica hardly flocculates and hence is finely and microscopically dispersed at the time of melt kneading and molding, resulting in a uniform three-dimensional network structure.

Here, the hydrophobic silica is a silica which is rendered hydrophobic by chemically reacting the silanol group on the surface of silica with an organosilicone compound such as dimethylsilane or dimethyldichlorosilane to substitute the surface of the silica with a methyl group or the like.

Moreover, the three-dimensional network structure means a structure in which there are present substantially no macro-voids (large voids) at the section of the membrane and there are present pores communicating in all three-dimensional directions. If macro-voids are present at the section of the membrane, the strength of the membrane deteriorates, and if they are continuously present, this causes leakage. The macro-void means a void of not less than 8 μm in approximate diameter in terms of a sphere.

The sectional structure of the hollow fiber membrane obtained by the method using the inorganic fine powder is a uniform three-dimensional network structure having no macro-voids. However, since the membrane is drawn, it is seen that the network structure is elongated in the fiber length direction.

The mixture comprising polyvinylidene fluoride and an organic liquid or the mixture comprising polyvinylidene fluoride, an organic liquid and an inorganic fine powder is obtained by mixing the components by a Henschel mixer, Banbury mixer, plough share mixer, etc. As for the mixing order of the three components of the polyvinylidene fluoride, the organic liquid and the inorganic fine powder, it is more advantageous to first mix the inorganic fine powder and the organic liquid, thereby sufficiently adsorbing the organic liquid to the inorganic fine powder and then to mix the mixture with polyvinylidene fluoride than to mix the three components all together at one time, from the point of improvement in melt moldability, and porosity and mechanical strength of the resulting porous membrane.

The mixture is melt kneaded and extruded in the form of hollow fibers by melt kneading extruders such as a twin-screw extruder, followed by cooling and solidification to form hollow fibers. In the case of the two components of polyvinylidene fluoride and the organic liquid, the polyvinylidene fluoride and the organic liquid may be directly and separately fed to a melt kneading extruder such as a twin-screw extruder without carrying out the preliminary kneading by a Henschel mixer or the like. In order to enhance the kneadability, after the mixing, the melt kneading is carried out to prepare pellets, and the pellets may be fed to a melt kneading extruder and extruded in the form of hollow fibers, followed by cooling and solidification to form hollow fibers.

As mentioned above, the method for producing hollow fiber membranes according to the present invention is characterized by including steps of drawing the hollow fibers before termination of the extraction or after termination of the extraction and then shrinking the hollow fibers.

By drawing the hollow fibers before termination of the extraction or after termination of the extraction, the finally obtained hollow fiber membranes can be expected to have a high permeability and a high strength.

Drawing is preferably carried out at a space temperature of not lower than 0° C. and not higher than 160° C. If it is higher than 160° C., unevenness in drawing is great and furthermore break elongation decreases and water permeation performance is deteriorated, which is not preferred. If it is lower than 0° C., the possibility of breaking at drawing is high, which is practically not preferred. The space temperature during the drawing step is more preferably not lower than 0° C. and not higher than 80° C.

The draw ratio is desirably in the range of not less than 1.1 and not more than 3.0 times. The draw ratio here means a ratio obtained from the length of hollow fibers when drawn to the maximum during the drawing step. For example, when a fiber of 10 cm is drawn to 20 cm, the draw ratio is 2.0 times, and when a fiber of 10 cm is drawn to 20 cm, and then is shrunk to 15 cm, the draw ratio is also 2.0 times. That is, the draw ratio is expressed by the following formula: draw ratio=the maximum length of fiber in drawing/the original length of fiber. If the draw ratio is less than 1.1, the water permeation performance is apt to be deteriorated, which is not preferred, and if the draw ratio is more than 3.0, the pressure resistant strength considerably decreases or the possibility of breakage by drawing is high, which is not practical. The draw ratio is more preferably 1.6 or more, most preferably 1.8 or more.

In the present invention, it is preferred to draw the hollow fibers containing the organic liquid. The hollow fibers containing the organic liquid are less in breakage at the time of drawing than the hollow fibers containing no organic liquid. Furthermore, since the hollow fibers containing the organic liquid can be made greater in shrinking after drawing, the degree of freedom of setting the degree of shrinkage after drawing increases.

Furthermore, it is preferred to draw the hollow fibers containing the inorganic fine powder. The hollow fibers containing the inorganic fine powder are hardly crushed flat at the time of drawing because of the hardness of the hollow fibers given by the presence of the inorganic fine powder contained in the hollow fibers. Moreover, in the case of the hollow fibers containing the inorganic fine powder, the finally obtained hollow fiber membranes can be inhibited from having too small pore diameter or from having too small fiber diameter.

In the present invention, it is more preferred to draw the hollow fibers containing both the organic liquid and the inorganic fine powder.

For the above reasons, it is preferred to draw the hollow fibers containing either one of the organic liquid and the inorganic fine powder than to draw the hollow fibers after termination of the extraction thereof. Furthermore, it is more preferred to draw the hollow fibers containing both the organic liquid and the inorganic fine powder than to draw the hollow fibers containing either one of the organic liquid and the inorganic fine powder.

Moreover, subjecting the drawn hollow fibers to extraction has an advantage that the extraction solvent readily penetrates into the hollow fibers because vacant spaces on the surface and the inside of the hollow fibers increase by the drawing. Furthermore, carrying out the extraction after the steps of drawing and subsequent shrinking gives hollow fibers which are low in tensile modulus and can be readily bent as mentioned hereinafter, and, hence, when the extraction is carried out in a liquid stream, the hollow fibers are more readily shaken by the liquid stream, resulting in increase of the stirring effect. Thus, this method has an advantage that it is possible to perform the extraction at high efficiency in a short time.

Since the present invention includes the steps of drawing the hollow fibers and subsequently shrinking the fibers, hollow fibers or hollow fiber membranes of low tensile modulus can be finally obtained. Here, "low tensile modulus" means that the fiber easily elongates by a small force and returns to the original length upon removal of the force. When the tensile modulus is low, the hollow fiber membrane is not crushed flat, is readily bent and is readily shaken with a water stream during filtration. Since the fibers are shaken with a water stream without causing fixation of the bends of the fibers, the layer of staining materials deposited on the surface of the membrane does not grow and can be easily stripped off, and the amount of water filtered can be kept at a high level. Moreover, in case the fibers are forcedly shaken by flushing or air scrubbing, the degree of shaking is great and the cleaning recovery effect increases.

The degree of shrinking of fiber length in carrying out the shrinking after drawing is preferably such that the shrinkage of fiber length with respect to the increment of fiber length upon drawing is in the range of not less than 0.3 and not more than 0.9. For example, when a fiber of 10 cm is drawn to 20 cm and then is shrunk to 14 cm, the shrinkage of fiber length is 0.6 in accordance with the following formula.

Shrinkage of fiber length={(maximum fiber length in drawing)−(fiber length after shrinking)}/{(maximum fiber length in drawing)−(original fiber length)=(20−14)/(20−10)=0.6.

If the shrinkage of fiber length is more than 0.9, the water permeation performance is apt to be deteriorated, and if it is less than 0.3, the tensile modulus tends to increase, which is not preferred. In the present invention, the shrinkage of fiber length is more preferably in the range of not less than 0.50 and not more than 0.85.

Furthermore, by employing the steps of drawing the hollow fibers to the maximum length at the time of drawing and then shrinking them, the finally obtained hollow fiber membranes do not break when they are drawn to the maximum fiber length during use.

Here, when the draw ratio is referred to as X and the shrinkage of fiber length with respect to the increment of fiber length upon drawing is referred to as Y, the rate Z which indicates the degree of guarantee of break elongation can be defined by the following formula.

Z=(maximum fiber length in drawing−fiber length after shrinking)/fiber length after shrinking= (XY−Y)/(X+Y−XY).

Z is preferably not less than 0.2 and not more than 1.5, more preferably not less than 0.3 and not more than 1.0. If Z is too small, guarantee of break elongation is small, and if Z is too large, the water permeation performance is low in comparison with the high possibility of breaking during drawing.

Furthermore, since the method of the present invention includes the steps of drawing and subsequent shrinking, as for the tensile break elongation, breakage hardly occurs at low elongation, and distribution of the tensile break elongation can be narrowed.

The space temperature during the steps of drawing and subsequent shrinking is preferably not lower than 0° C. and not higher than 160° C., more preferably not lower than 0° C. and not higher than 100° C. from the points of shrinking time and physical properties. If the temperature is lower than 0° C., a long time is required for shrinking, which is not practical, and if it is higher than 160° C., the break elongation lowers and water permeation performance deteriorates, which are not preferred.

In the present invention, it is preferred to crimp the hollow fibers during the shrinking step. By crimping the hollow fibers during shrinking, hollow fibers of high crimping degree can be obtained without causing rupture or flaws.

In general, since hollow fiber membranes have a shape of a straight tube with no bend, when they are bundled to make a filtration module, spaces cannot be left between the hollow fibers and a fiber bundle low in porosity is apt to be formed. On the other hand, when hollow fiber membranes of high crimping degree are used, the spaces between the hollow fiber membranes are uniformly enlarged due to the bends of the respective fibers, whereby fiber bundles of high porosity can be obtained. A filtration module comprising hollow fiber membranes of low crimping degree decreases in spaces of fiber bundles when used particularly under external pressure, causing increase of flow resistance, and thus the filtration pressure is not effectively transmitted to the central part of the fiber bundle. Furthermore, when the filtration deposits are stripped off from the hollow fiber membranes by back washing or flushing, the effect to clean the inside of the fiber bundle is lowered. In the case of a fiber bundle comprising hollow fiber membranes of high crimping degree, the porosity is high, spaces between the hollow fiber membranes are maintained even if the fiber bundle is used for filtration under external pressure, and deflective flow hardly occurs.

In the present invention, the crimping degree is preferably not less than 1.5 and not more than 2.5. The crimping degree of less than 1.5 is not preferred for the above-mentioned reasons, and if it is more than 2.5, the filtration area per volume decreases, which is not preferred.

For crimping the hollow fibers, for example, the following method can be employed. That is, during the steps of drawing and subsequent shrinking, the hollow fibers are put between a pair of gear rolls having periodic irregularities or a pair of sponge belts having irregularities and are taken off therefrom while they are being shrunk. For controlling the crimping degree, it is preferred that the space temperature in the first half of the shrinking step of the hollow fibers is not lower than 60° C. and not higher than 100° C., and the second half is carried out while giving crimps by cooling with water or air of not lower than 0° C. and not higher than 40° C.

Furthermore, in the present invention, it is preferred to carry out the drawing by a take-off machine comprising a pair of opposed infinite track type belts. In this case, the take-off machines are used on the upstream side and downstream side of the drawing, and in the respective take-off machines, the hollow fibers are interposed between the opposed belts and both the belts are moved at the same speed and in the same direction, thereby to perform carrying of the fibers. Furthermore, in this case, it is preferred to draw the hollow fibers in such a manner that the fiber carrying speed on the downstream side is higher than the fiber carrying speed on the upstream side. When the drawing is carried out in this way, the hollow fibers can be drawn without yielding to the drawing tension and without causing slipping and can be prevented from crushing flat.

Here, the infinite track type belt is preferably such that the inside which contacts with a driving roll is made of a high-modulus belt such as a fiber-reinforced belt and the outer surface which contacts with the hollow fibers is made of an elastic material. It is further preferred that the elastic material has a compressive modulus of not less than 0.1 MPa and not more than 2 MPa in the thickness direction and has a thickness of not less than 2 mm and not more than 20 mm. It is especially preferred from the points of chemical resistance and heat resistance that the elastic material of the outer surface is a silicone rubber.

Extraction of the organic liquid can be carried out using a solvent such as methylene chloride which is inert to polyvinylidene fluoride and compatible with the organic liquid. Moreover, extraction of the inorganic fine powder, for example, hydrophobic silica, can be carried out by immersing the hollow fibers in an aqueous sodium hydroxide solution and then washing the fibers with water.

The relation between the step of extracting the organic liquid and the inorganic fine powder in the case of the mixture comprising polyvinylidene fluoride, the organic liquid and the inorganic fine powder and the step of drawing the hollow fibers and then shrinking them has no special limitation, but in the present invention it is preferred that the step of drawing the hollow fibers and then shrinking them is carried out before extraction of the organic liquid and before extraction of the inorganic fine powder or after extraction of the organic liquid and before extraction of the inorganic fine powder.

The method for producing the hollow fiber membranes according to the present invention preferably includes a step of heat treating the hollow fibers after the steps of drawing the hollow fibers and then shrinking them. By carrying out the heat treatment, the pressure resistant strength expressed by compressive strength and burst strength can be increased. For example, when the compressive strength of the hollow fiber membranes is high, the hollow fiber membranes can be prevented from crushing flat during filtration under external pressure or back washing under external pressure in which a compressive force is applied to the outside of the hollow fibers. If the hollow fibers are crushed, the filtration resistance conspicuously increases owing to clogging of the flow path of the filtered water.

The heat treatment of the hollow fibers is preferably carried out at not lower than 100° C. and not higher than 160° C. If the heat-treating temperature is higher than 160° C., break elongation and water permeation performance are deteriorated, which is not preferred, and if it is lower than 100° C., the pressure resistant strength is not sufficiently high, which is not preferred. Moreover, the heat treatment is preferably carried out on the hollow fibers after termination of the extraction because the fibers suffer less change in fiber diameter, porosity, pore diameter and water permeation performance.

The present invention preferably includes a step of penetrating an ethylene-vinyl alcohol copolymer solution containing an ethylene-vinyl alcohol copolymer and a solvent which is inert to polyvinylidene fluoride and dissolves the ethylene-vinyl alcohol copolymer into the pores in the hollow fibers after extraction and then drying the fibers to remove the solvent from the pores present in the thickness portion of the hollow fibers. By carrying out this step, hollow fiber membranes of high filtration stability can be stably produced.

Since an ethylene-vinyl alcohol copolymer is excellent in stain resistance and heat resistance and is insoluble in water, it is suitable as a material for coating the membranes. The polyvinylidene fluoride hollow fiber membranes obtained by the method of the present invention are high in strength and compressive resistance. Therefore, by further coating the polyvinylidene fluoride hollow fiber membranes with an ethylene-vinyl alcohol copolymer, hollow fiber membranes high in strength and pressure resistance and markedly excellent in stain resistance can be obtained. The polyvinylidene fluoride per se is hydrophobic, but, for example, when subjected to an alkali treatment, the wettability of the surface of the pores present in the surface portion and inside of the polyvinylidene fluoride hollow fibers is improved, and, hence, coating with ethylene-vinyl alcohol copolymer can be efficiently performed.

Ethylene-vinyl alcohol copolymers are crystalline thermoplastic resins synthesized, for example, by copolymerizing ethylene with vinyl acetate, and then saponifying (hydrolyzing) the acetate ester portion of the side chains originating from vinyl acetate, thereby to convert the side chains to hydroxyl groups. The ethylene content in the ethylene-vinyl alcohol copolymer used in the present invention is preferably not less than 20 mol % from the point of coating efficiency and is preferably not more than 60 mol % from the point of stain resistance. The higher saponification degree is preferred, and from the point of mechanical strength, it is preferably not less than 80 mol %, and especially preferably not less than 99 mol %, which means that the acetate ester portion is substantially completely saponified. If necessary, the ethylene-vinyl alcohol copolymer may further contain additives such as an antioxidant and a lubricant as long as they do not hinder the attainment of the object of the present invention.

A specific method for coating the ethylene-vinyl alcohol copolymer on the polyvinylidene fluoride hollow fibers comprises first dissolving the ethylene-vinyl alcohol copolymer in a solvent which does not dissolve polyvinylidene fluoride, but dissolves the ethylene-vinyl alcohol copolymer, for example, a mixed solvent comprising water and isopropyl alcohol, thereby to prepare a solution of ethylene-vinyl alcohol copolymer, then penetrating the solution into the polyvinylidene fluoride hollow fibers which have been drawn and subjected to extraction, and then removing the solvent by drying the fibers to obtain polyvinylidene fluoride hollow fiber membranes coated with an ethylene-vinyl alcohol copolymer. The drawing and removal of the solvent by drying may be carried out after penetration of the solution into the hollow fibers which have been subjected to the extraction.

The coating amount of the ethylene-vinyl alcohol copolymer with respect to the hollow fiber membranes in the polyvinylidene fluoride hollow fiber membranes coated with the ethylene-vinyl alcohol copolymer of the present invention is preferably not less than 0.1% by weight from the viewpoint of the effect of inhibiting staining with organic materials and is preferably not more than 10% by weight from the viewpoint of water permeation performance. The coating amount is more preferably not less than 0.5% by weight and not more than 7% by weight, and further preferably not less than 1% by weight and not more than 5% by weight. It is preferred to coat the copolymer uniformly on the inner and outer surface of the hollow fibers and on the surface of the fine pores in the thickness portions inside the fibers.

According to the above-mentioned method, hollow fiber membranes of low tensile modulus and high compressive strength can be obtained, and thus there can be provided polyvinylidene fluoride hollow fiber membranes suitable for filtration uses such as removal of turbidity, which have dense pores and high water permeation performance and are excellent in endurance and stain resistance.

The hollow fiber membranes obtained by the method of the present invention have desirably the following features for attaining the object of the present invention.

The inner diameter of the hollow fiber membrane is not less than 0.4 mm from the viewpoint of resistance of liquid passing through the tube of hollow fiber (pressure loss in tubes), and not more than 3.0 mm from the viewpoint of area of packed membranes per unit volume. The inner diameter is more preferably not less than 0.5 mm and not more than 1.5 mm.

When the ratio of outer diameter/inner diameter of the hollow fiber membrane is too low, resistance against pulling, implosion or compression is not sufficient, and when it is too high, the thickness of the membrane is too great as compared with the area of the membrane, which causes deterioration of filtration performance. Therefore, the ratio of outer diameter/inner diameter of the hollow fiber membrane is suitably not less than 1.3 and not more than 2.3. It is more preferably not less than 1.5 and not more than 2.1, and further preferably not less than 1.6 and not more than 2.0.

The porosity of the hollow fiber membrane is not less than 60% from the viewpoint of water permeation performance, and is not more than 90% from the viewpoint of strength. It is more preferably not less than 65% and not more than 85%, and further preferably not less than 70% and not more than 80%.

The porosity can be determined by the following formula.

Porosity (%)=100×(weight of wet membrane [g]–weight of dry membrane [g])/water specific gravity [g/cm$^3$]/(volume of membrane [cm$^3$])

Here, the wet membrane means a membrane in such a state that the pores are filled with pure water, but the hollow portions do not contain pure water. Specifically, the wet membrane can be obtained by dipping a sample membrane of 10–20 cm in length in ethanol to fill the pores with ethanol, then dipping the membrane in pure water repeatedly 4–5 times to sufficiently replace the content in the pores with pure water, and then holding one end of the hollow fiber membrane and shaking the membrane well about 5 times, and furthermore holding another end of the hollow fiber membrane and again shaking it well about 5 times to remove water in the hollow portions. The dry membrane can be obtained by drying the wet membrane after being subjected to a measurement of weight in an oven, for example, at 60° C. until the membrane reaches constant weight.

The volume of membrane can be obtained by the following formula.

Volume of membrane [cm$^3$]=π×{(outer diameter [cm]/2)$^2$–(inner diameter [cm]/2)$^2$}×length of membrane [cm]

If in the case of one membrane, the weight is too small and the measurement error is large, a plurality of the membranes can be used.

The pore diameter of the hollow fiber membrane is suitably not less than 0.05 μm and not more than 5.0 μm in average pore diameter. The average pore diameter is more preferably not less than 0.05 μm and not more than 1.0 μm, and further preferably not less than 0.1 μm and not more than 0.5 μm. If the average pore diameter is less than 0.05 μm, filtration flow rate is small, which is not preferred. If the average pore diameter is more than 5.0 μm, turbid substances cannot be effectively separated by filtration and, further, the turbid substances are apt to clog in the membrane to cause considerable deterioration in filtration quantity with lapse of time.

The average pore diameter of the membrane can be determined by the method described in ASTM: F316–86 (called "half-dry method"). This half-dry method determines the average pore diameter of the minimum pore diameter layer of the membrane.

In the present invention, the measurement of the average pore diameter by the half-dry method is carried out using ethanol as a liquid under standard conditions of 25° C. and a pressurizing rate of 0.001 MPa/second. The average pore diameter [μm] can be obtained by the following formula.

Average pore diameter [μm]=(2860×surface tension [mN/m])/half-dry air pressure [Pa]

The surface tension of ethanol at 25° C. is 21.97 mN/m ("Chemical Handbook (Kagaku Binran), basic volume, the revised 3rd edition, Page II-82", edited by Japan Chemical Society and published from Maruzen Co., Ltd., in 1984). Therefore, under the standard measurement conditions in the present invention, the average pore diameter can be obtained by average pore diameter [μm]=62834.2/(half-dry air pressure [Pa]).

The maximum pore diameter of the membrane can be obtained from the pressure at which bubbles are first generated from the membrane in the half-dry method (bubble point method). In the case of the above standard measurement conditions of the half-dry method, the maximum pore diameter can be obtained by the following formula and the pressure at which bubbles are first generated from the membrane.

Maximum pore diameter [μm]=62834.2/(bubble generation air pressure [Pa]).

The ratio of the maximum pore diameter of the membrane and the average pore diameter of the membrane is preferably less than 2.0. If the ratio is 2.0 or more, there is the problem of leakage, and, moreover, the effect of back washing decreases.

The great feature of the hollow fiber membrane obtained by the method of the present invention is that the membrane is low in tensile modulus although it is high in tensile break modulus, compressive strength and compressive modulus.

That the membrane is high in tensile break strength means that the membrane has a high resistance against breakage when the membranes are used for filtration as a module or they are flushed. The tensile break strength is suitably in the range of not lower than 5 MPa and not higher than 20 MPa. If it is lower than 5 MPa, breakage of fibers frequently occurs. If it is higher than 20 MPa, the water permeation performance is deteriorated. The tensile break strength is more preferably not lower than 7 MPa.

The instantaneous compressive strength is preferably not lower than 0.3 MPa and not higher than 3.0 MPa, more preferably not lower than 0.6 MPa, and furthermore suitably not lower than 0.8 MPa in order that rupture hardly occurs during filtration under external pressure and the membrane has a satisfactory permeability.

The compressive modulus is preferably not less than 1.5 MPa and not more than 10 MPa, more preferably not less than 2 MPa, and further preferably not less than 4 MPa in order that rupture hardly occurs and the membrane has a satisfactory permeability.

The tensile modulus is preferably not less than 10 MPa and not more than 80 MPa, more preferably not less than 10 MPa and not more than 70 MPa, further preferably not less than 20 MPa and not more than 60 MPa. If it is less than 10 MPa, the membranes lack stiffness and they can hardly be bundled to make a module. If it is more than 80 MPa, the effect of shaking of fibers is small.

Furthermore, the hollow fiber membrane obtained by the method of the present invention has the characteristics that it is high in resistance against marring and excellent in repeated fatigue resistance. In general, when membranes are marred, mars further grow from the starting points to result in leakage or breakage, while the hollow fiber membrane obtained by the method of the present invention hardly break at the mars probably because of the low tensile modulus. Especially, when the membrane has a uniform three-dimensional network structure, there is the merit that even if the surface is marred, the rejection pore diameter does not substantially change unless the mars pierce the membranes.

Moreover, the membrane has high repeated fatigue resistance probably due to the softness of the membrane provided by the low tensile modulus. The bonded interface portion of the end of the module is a portion which is apt to undergo repeated fatigue every time the hollow fibers shake and is readily broken, while the membrane obtained by the method of the present invention which has low tensile modulus is less in breakage.

The tensile break elongation is suitably not less than 30% and less than 200%, more preferably not less than 50% and less than 150%. If the tensile break elongation is less than 30%, the possibility of breakage of the membrane increases in the case of forcedly shaking the fibers by flushing or air scrubbing, and if it is more than 200%, strength against bursting or compression is low or the tensile modulus increases due to the low draw ratio, which is not preferred. Moreover, since the method of the present invention includes the steps of drawing and subsequent shrinking, as for the tensile break elongation, the membrane is hardly broken at low elongation, and distribution of the tensile break elongation can be narrowed.

The pure water permeation rate is suitably not less than 1000 L/(m$^2$·hr) and not more than 30000 L/(m$^2$·hr) from the viewpoints of resistance against pulling, bursting or compressing, and permeation performance. It is more preferably not less than 2000 L/(m$^2$·hr), and further preferably not less than 3000 L/(m$^2$·hr).

The pure water permeation rate can be measured by the following method in a standard manner.

One end of a wet hollow fiber membrane of about 10 cm in length which has been dipped in ethanol and then dipped in pure water repeatedly several times is sealed, and an injection needle is inserted into the hollow portion of another end. Pure water of 25° C. is injected into the hollow portion under a pressure of 0.1 MPa through the injection needle in an environment of 25° C., and the amount of pure water which permeates through the outer surface is measured. The pure water permeation rate is obtained by the following formula.

Pure water permeation rate [L/(m$^2$·hr)]=amount of permeation water [L]/($\pi$×inner diameter of membrane [m]×effective length of membrane [m]×measuring time [hr]).

Here, the effective length of membrane means a net length of membrane excluding the portion in which the injection needle is inserted.

The critical surface tension of the hollow fiber membrane is preferably not less than 45 mN/m and not more than 73 mN/m because staining substances hardly adhere to the membrane. The critical surface tension of polyvinylidene fluoride per se is about 33 mN/m, but it can be made to 45 mN/m or more by treating the membrane, for example, in an aqueous alkali solution. Furthermore, since the critical surface tension of an ethylene-vinyl alcohol copolymer is not less than 70 mN/m, the polyvinylidene fluoride hollow fiber membrane coated with an ethylene-vinyl alcohol copolymer can have a critical surface tension of not less than 70 mN/m.

The value of the critical surface tension of the hollow fiber membrane is defined to be an upper limit value of surface tension of a liquid which can wet the hollow fiber membrane in the dry state. The value of the critical surface tension of the hollow fiber membrane can be measured in accordance with JIS K6768 using, for example, a standard liquid for wetting index manufactured by Wako Junyaku Co., Ltd. Specifically, a plurality of standard liquids differing stepwise in surface tension are prepared, and one of them is dropped onto the surface of the hollow fiber membrane. The droplet is spread on the surface of the membrane, and the upper limit of the surface tension of the standard liquid at which the liquid can wet the surface for 2 seconds or more without causing breakage of liquid film of the dropped standard liquid is adopted as the critical surface tension.

EXAMPLES

Examples of the present invention will be shown below, which do not limit the present invention. First, methods for the measurement of various properties of the membranes are explained.

1) Tensile break strength, tensile break elongation, tensile modulus:

A wetted hollow fiber membrane was pulled using a tensile tester (AUTOGRAPH Model AG-A manufactured by Shimadzu Seisakusho Ltd.) at a distance between chucks of 50 mm and a pulling rate of 200 mm/min, and a tensile break strength and a tensile break elongation were obtained from the load and the displacement at the breaking by the following formula. The measurement was conducted in a room of a temperature of 25° C. and a relative humidity of 40–70%.

Tensile break strength [Pa]=load at break [N]/sectional area of membrane [m$^2$]. In this formula, the sectional area of membrane [m$^2$]=$\pi$×{(outer diameter [m]/2)$^2$−(inner diameter [m]/2)$^2$}.

Tensile break elongation [%]=100×displacement at break [mm]/50 [mm]

The tensile modulus [Pa] was obtained by obtaining a load at 100% displacement from the load at 0.1% displacement and the load at 5% displacement in the above tensile test and dividing the thus obtained load at 100% displacement by the sectional area of the membrane.

2) Compressive Modulus:

On a portion of 5 mm in length of a wetted hollow fiber membrane, a compressive displacement and a load in the direction perpendicular to the fiber length direction were measured using a compression fixture of 5 mm in width by a compressive tester (AGS-H/EZ test manufactured by Shimadzu Seisakusho Ltd.). Compression rate was 1 mm/min. A load at 100% displacement was obtained from the load at 0.1% displacement and the load at 5% displacement with respect to the initial diameter of the hollow fiber membrane, and was standardized with a projected sectional area obtained by multiplying the initial outer diameter of the hollow fiber and a length of 5 mm of the hollow fiber membrane, thereby obtaining the compressive modulus. The measurement was conducted in a room having a temperature of 25° C. and a relative humidity of 40–70%. The compressive modulus in the thickness direction of an infinite track type belt was similarly measured on a dry sample.

3) Instantaneous Compressive Strength:

A wetted hollow fiber membrane, one end of which was sealed, was put in a pressure container filled with pure water of 40° C., and the portion of the outer surface side of the hollow fiber membrane was watertightly filled with pure water, and the hollow portion of the inner surface side was kept open to the atmosphere. The water pressure was raised to 0.05 MPa over 15 seconds by air and the water was transferred from the outer surface side to the inner surface side of the hollow fiber to obtain filtrated water (external pressure type). The amount of filtrated water for 15 seconds was measured, and then the pressure was further raised by 0.05 MPa over 15 seconds, and the amount of filtrated water for 15 seconds was again measured. This cycle was continued. In the course of raising the pressure during this continued cycle, the membrane was broken and the amount of the filtrated water diversely began to decrease. The pressure at which the amount of the filtrated water became maximum was adopted as the instantaneous compressive strength [Pa].

4) Pure Water Permeation Rate:

One end of a wetted hollow fiber membrane of about 10 cm in length which had been dipped in ethanol and then dipped in pure water repeatedly several times was sealed, and an injection needle was inserted into the hollow portion of another end. Pure water of 25° C. was injected into the hollow portion under a pressure of 0.1 MPa through the injection needle in an environment of 25° C., and amount of pure water which permeated through the outer surface was measured. The pure water permeation rate was obtained by the following formula.

Pure water permeation rate [L/(m$^2$·hr)]=amount of permeation water [L]/($\pi$×inner diameter of membrane [m]×effective length of membrane [m]×measuring time [hr]).

Here, the effective length of membrane means a net length of membrane excluding the portion in which the injection needle is inserted.

5) Weight-Average Molecular Weight (Mw):

Molecular weight in terms of polystyrene obtained by GPC. GPC measuring apparatus: LS-8000 manufactured by Toyo Soda Mfg. Co., Ltd.; Column: GMHXL; Solvent: DMF; Column temperature: 40° C.

6) Amount of Silica Remaining in Membrane:

Elemental analysis was carried out on carbon, fluorine, oxygen, nitrogen and silicon on the surface of the hollow fiber membrane after subjecting it to extraction by X-ray photo-electron spectroscopy (XPS), and the amount (% by weight) of silica remaining in the membrane was obtained from the relative elemental concentration of silicon. According to this method, the amount of silica remaining in the portion of 1 nm in depth from the membrane surface was measured.

7) Crimping Degree:

About 1000 hollow fiber membranes were bundled, and the peripheral length of the bundle of hollow fiber membranes was measured while applying a tension of 1 kg to a band made of PET and having a width of 4 cm, and the crimping degree of the hollow fiber membranes was obtained by the following formula.

Crimping degree=(peripheral length [m]/$\pi$)$^2$/((diameter of hollow fiber [m])$^2$×the number of hollow fibers)

8) Coating Amount:

The coating amount of ethylene-vinyl alcohol copolymer was obtained by the following formula.

Coating amount (% by weight)=100×{(weight [g] of dry polyvinylidene fluoride membrane coated with ethylene-vinyl alcohol copolymer)−(weight [g] of dry polyvinylidene fluoride membrane)}/ (weight [g] of dry polyvinylidene fluoride membrane coated with ethylene-vinyl alcohol copolymer)

The dry membrane was obtained by drying at 60° C. in an oven until it reached constant weight.

Figure 5:
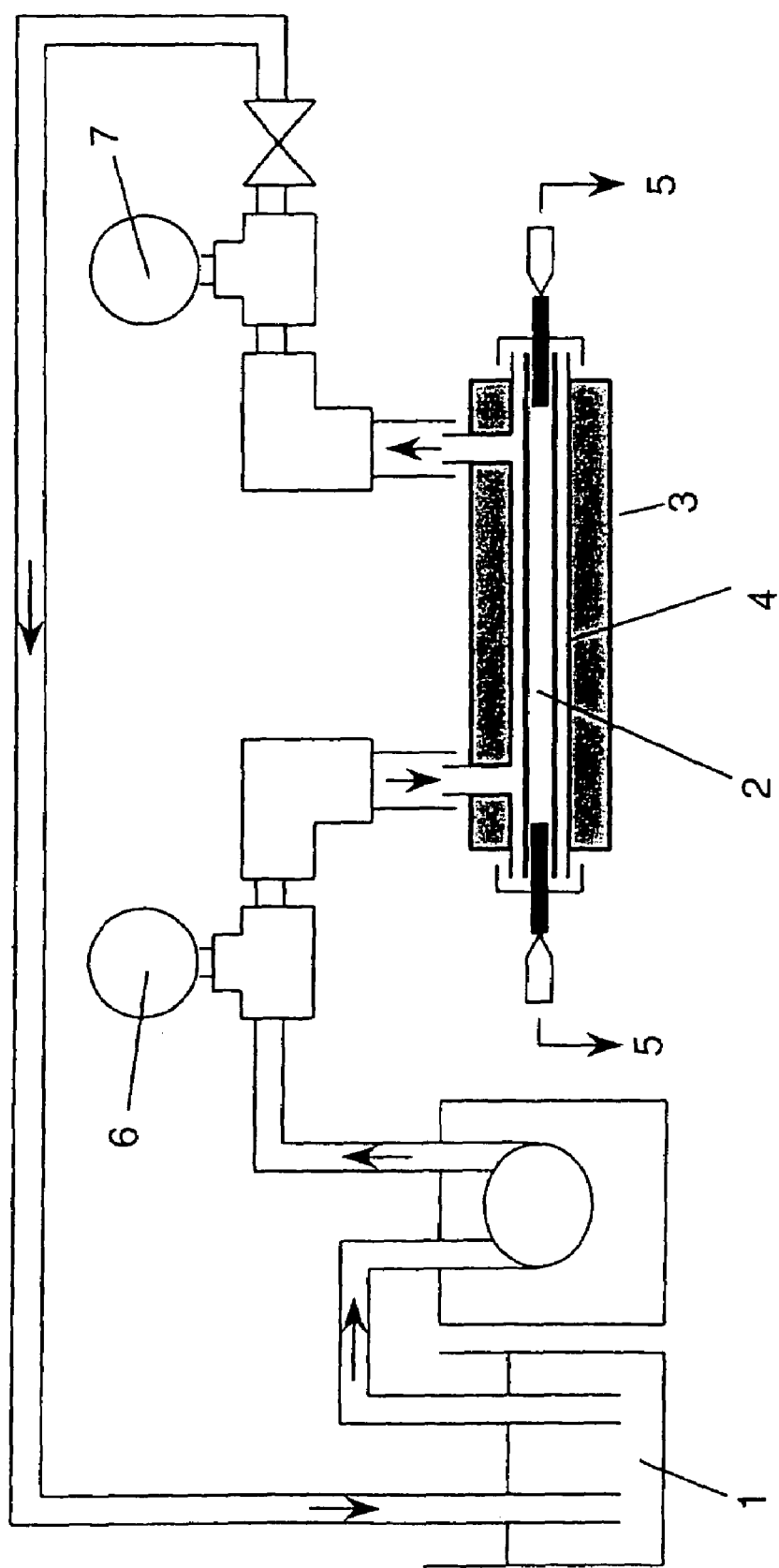
FIG. 5 is a schematic view of an apparatus for measurement of water permeation performance in filtration of suspension water.

9) Water Permeation Performance Retention rate in filtration of suspension water:

For obtaining an indication of the resistance (stain resistance) against deterioration of water permeation performance due to clogging (membrane stain), measurement was conducted using an apparatus shown in FIG. 5. Wet hollow fiber membrane 2 was inserted in a pencil module 3 (a module comprising a tube 4 of 4 mm$\phi$ in inner diameter provided with an inlet and an outlet for raw water 1 at the side wall of the tube), and filtration was carried out with an effective membrane length of 11 cm by an external pressure type method. First, pure water was subjected to filtration under a filtration pressure that permeates 10 m$^3$ per 1 m$^2$ of the outer surface area of the membrane per 1 day, and permeation water 5 was collected for 2 minutes, and the amount of the collected water was employed as the initial pure water permeation amount. Then, sewage subjected to secondary treatment which was suspension water was filtered for 30 minutes under the same filtration pressure as in the measurement of the initial pure water permeation amount, and permeation water 5 was collected for 2 minutes from 28 minutes to 30 minutes after beginning of the filtration, and the amount of the collected water was employed as a water permeation amount in the filtration of suspension water. Introducing pressure and discharging pressure of the raw water were measured by a pressure gage 6 (introducing pressure) and a pressure gage 7 (discharging pressure), respectively. The water permeation performance retention rate in filtration of the suspension water was defined by the following formula. The operations were all conducted at 25° C. and a linear speed at the membrane surface of 0.1 m/sec.

Water permeation performance retention rate in filtration of suspension water [%]=100×(water permeation amount in filtration of suspension water [g])/(initial pure water permeation amount [g])

Here, the filtration pressure, the outer surface area of the membrane and the linear speed at the membrane surface are defined as follows.

Filtration pressure [Pa]={(introduction pressure of raw water [Pa])+(discharging pressure of raw water [Pa])}/2

Outer surface area of membrane [m$^2$]=$\pi$×(outer diameter of fiber [m])×(effective length of membrane [m])

Linear speed at membrane surface [m/s]=4×(amount of circulating water [m³/s])/{π(inner diameter of tube of pencil module [m])²−π(outer diameter of membrane [m])²}

The present invention will be explained by the following examples.

Example 1

23% by weight of hydrophobic silica having an average primary particle diameter of 0.016 μm and a specific surface area of 110 m²/g (AEROSIL-R972 (trademark) manufactured by Japan Aerosil Co., Ltd.), 30.8% by weight of dioctyl phthalate and 6.2% by weight of dibutyl phthalate (SP of mixture of these two compounds: 18.59 (MPa)$^{1/2}$) were mixed by a Henschel mixer, and to the mixture was added 40% by weight of polyvinylidene fluoride having a weight-average molecular weight of 290000 (KF polymer #1000 (trademark) manufactured by Kureha Chemical Industry Co., Ltd.), followed by further mixing by a Henschel mixer.

The resulting mixture was further melt kneaded by a 48 mmφ twin-screw extruder to prepare pellets. The pellets were continuously introduced into a 30 mmφ twin-screw extruder and melt extruded from a circular ring nozzle attached at the tip of the extruder at 240° C. while supplying air into the hollow portion. The extruded product was passed through a water bath of 40° C. at a spinning speed of 20 m/min after travelling about 20 cm through the air, thereby cooling and solidifying the extruded product to obtain hollow fibers. The hollow fibers were continuously taken off at a speed of 20 m/min by a pair of first infinite track type belt take-off machines, passed through a first heating bath (0.8 m in length) adjusted to a space temperature of 40° C., and further taken off at a speed of 40 m/min by second infinite track type belt take-off machines similar to the first infinite track type belt take-off machines, thereby drawing the fibers to 2.0 times. Furthermore, after passing through a second heating bath (0.8 m in length) adjusted to a space temperature of 80° C., the hollow fibers were taken off at a speed of 30 m/min by third infinite track type belt take-off machines, thereby shrinking the fibers to 1.5 times, and then wound up by a reel of about 3 m in peripheral length. All of the infinite track type belts of the infinite track type belt take-off machines comprised a fiber-reinforced belt and an elastic material made of silicone rubber which was adhered onto the belt to be integrated, and the silicone rubber elastic material on the outer surface side contacting with the hollow fibers had a thickness of 11 mm and a compressive modulus in the thickness direction of 0.9 MPa. The shrinkage of the fiber length with respect to the increment of the fiber length given by drawing was 0.5. Then, the hollow fibers were bundled and the bundle was dipped in methylene chloride at 30° C. for 1 hour repeatedly 5 times to extract dioctyl phthalate and dibutyl phthalate, and was dried. Subsequently, the bundle was dipped in a 50 wt % aqueous ethanol solution for 30 minutes, and furthermore transferred to water and dipped therein for 30 minutes to wet the hollow fibers with water. Furthermore, the bundle was dipped in a 5 wt % aqueous sodium hydroxide solution at 40° C. for 1 hour, and after this step was carried out twice, washing with water by dipping the bundle in warm water of 40° C. for 1 hour was carried out 10 times to extract the hydrophobic silica, followed by drying the bundle. The amount of silica remaining in the membrane was 0.4% by weight.

The resulting hollow fiber membranes had an outer diameter of 1.25 mm, an inner diameter of 0.65 mm, a porosity of 73%, an average pore diameter of 0.29 μm measured by the half-dry method, a maximum pore diameter of 0.37 μm measured by the bubble point method, a ratio of the maximum pore diameter and the average pore diameter of 1.28, and a pure water permeation rate of 5800 L/(m²·hr). The membranes had a tensile break strength of 8.5 MPa, a tensile break elongation of 135%, a tensile modulus of 20 MPa, a compressive modulus of 3.5 MPa, and an instantaneous compressive strength of 0.7 MPa. It was recognized from a photograph of a section of the membrane that the membrane had a three-dimensional network structure comprising uniform communicating pores, and macrovoids of 8 μm or more were not seen in the inner part of the membrane. The critical surface tension was 54 mN/m and the crimping degree was 1.45.

Figure 6:
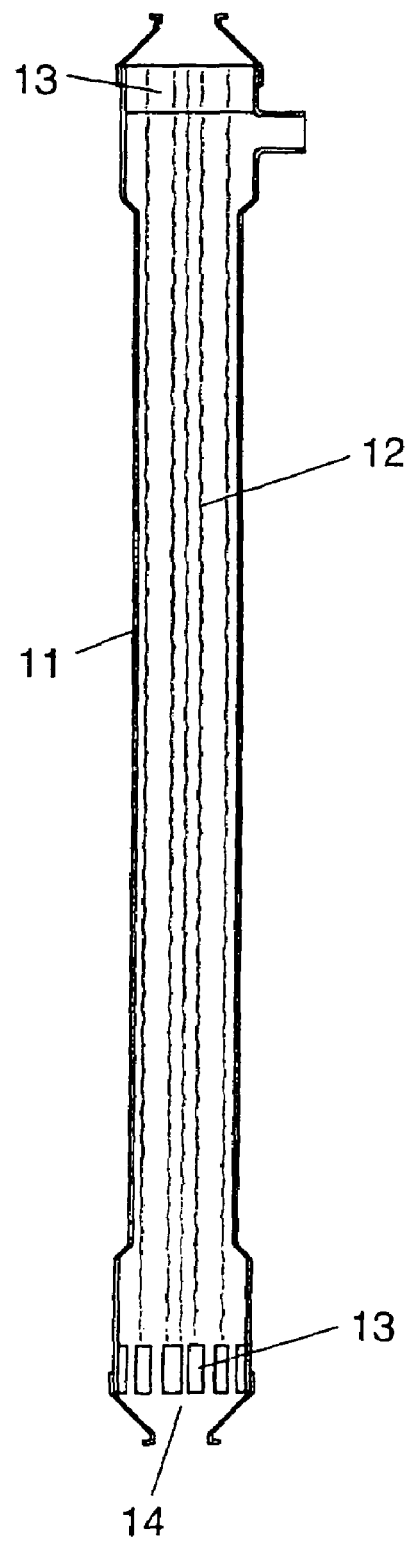
FIG. 6 is a sectional schematic view of a filtration module used in Examples 1, 2, 3 and 5, and Comparative Examples 1 and 2.

A filtration module 11 as shown in FIG. 6 was made using the hollow fiber membrane 12. The filtration module 11 had an effective membrane length of 1 m and comprised 300 hollow fibers, and the hollow fibers were sealed to each other at both ends with an epoxy sealing material 13. At the upper end of the module, the hollow portions of the hollow fiber membranes were open, and at the lower end of the module, the hollow portions of the hollow fiber membranes were sealed. River water having a turbidity of 2 degrees (measured by Model 2100P manufactured by HACH COMPANY) and a TOC (Total Organic Carbon) of 0.5 ppm (measured by TOC-5000A manufactured by Shimadzu Seisakusho Ltd.) was introduced from an inlet 14 for raw water and air and filtered through the outer surface side of the hollow fibers, and filtered water was obtained from the inner surface side of the upper end. The filtration was carried out for 29 minutes at a preset Flux of 2.7 m/day (the preset Flux (m/day) was a value obtained by dividing the filtration flow rate (m³/day) by the membrane outer surface area (m²)), followed by carrying out back washing and air scrubbing simultaneously for 60 seconds. The flow rate at the back washing was 4.0 m/day (based on membrane outer surface area), and the amount of air in the air scrubbing carried out for removing stains by ejecting fine air from the inlet 14 for raw water and air of the lower part of the module was 6.5 L/min. As a result of continuing this cycle, the module could be operated for more than 20 days at a stable transmembrane pressure.

Example 2

Hollow fiber membranes were obtained in the same manner as in Example 1, except that after being drawn and leaving the second heating bath (0.8 m in length) adjusted to a space temperature of 80° C., the hollow fibers were continuously passed between a pair of rugged rolls with four crests which had a peripheral length of about 0.20 m and were positioned on the water surface of a cooling water bath of 20° C. at a rotational speed of 170 rpm, whereby the hollow fibers were cooled while being periodically bent, and thereafter the hollow fibers were taken off at a speed of 30 m/min by the third infinite track type belt take-off machine and were subjected to extraction and drying, followed by heat-treating the dried hollow fiber membranes at 140° C. for 2 hours in an oven. The amount of silica remaining in the membranes was 0.4% by weight.

The resulting hollow fiber membranes after being subjected to the heat treatment had an outer diameter of 1.22 mm, an inner diameter of 0.67 mm, a porosity of 73%, an average pore diameter of 0.28 μm measured by the half-dry method, a maximum pore diameter of 0.36 μm measured by the bubble point method, a ratio of the maximum pore diameter and the average pore diameter of 1.29, and a pure water permeation rate of 4700 L/(m²·hr). The membranes had a tensile break strength of 10.1 MPa, a tensile break elongation of 120%, a tensile modulus of 44 MPa, a compressive modulus of 4.9 MPa, and an instantaneous compressive strength of 0.9 MPa. It was recognized from a photograph of a section of the membrane that the membranes had a three-dimensional network structure comprising uniform communicating pores, and macrovoids of 8 µm or more were not seen in the inner part of the membrane. The critical surface tension was 54 mN/m and the crimping degree was 1.72.

A module was made in the same manner as in Example 1 using the hollow fiber membranes after being subjected to the heat treatment, and filtration, back washing and air scrubbing were carried out in the same manner as in Example 1. As a result of continuing this cycle, the module could be operated for more than 20 days under a stable transmembrane pressure (FIG. 3, A).

Example 3

Hollow fiber membranes were obtained in the same manner as in Example 2, except that a polyvinylidene fluoride polymer having a weight-average molecular weight of 310000 (Solef 6010 (trademark) manufactured by SOLVAY Co.) was used as the polyvinylidene fluoride polymer. The amount of silica remaining in the membrane was 0.4% by weight.

The resulting hollow fiber membranes after being subjected to the heat treatment had an outer diameter of 1.22 mm, an inner diameter of 0.66 mm, a porosity of 72%, an average pore diameter of 0.27 µm measured by the half-dry method, a maximum pore diameter of 0.35 µm measured by the bubble point method, a ratio of the maximum pore diameter and the average pore diameter of 1.30, and a pure water permeation rate of 4700 L/(m²·hr). The membranes had a tensile break strength of 8.9 MPa, a tensile break elongation of 130%, a tensile modulus of 37 MPa, a compressive modulus of 4.4 MPa, and an instantaneous compressive strength of 0.9 MPa. It was recognized from a photograph of a section of the membrane that the membrane had a three-dimensional network structure comprising uniform communicating pores, and macrovoids of 8 µm or more were not seen in the inner part of the membrane (FIG. 1). The critical surface tension was 54 mN/m and the crimping degree was 1.70. A module was made in the same manner as in Example 1 using the resulting hollow fiber membranes, and filtration, back washing and air scrubbing were carried out in the same manner as in Example 1. As a result, the module could be operated for more than 20 days under a stable transmembrane pressure.

Example 4

23% by weight of hydrophobic silica having an average primary particle diameter of 0.016 µm and a specific surface area of 110 m²/g, 33.3% by weight of dioctyl phthalate and 3.7% by weight of dibutyl phthalate (SP of the mixed liquid of these two compounds: 18.47 (MPa)$^{1/2}$) were mixed by a Henschel mixer, and to the mixture was added 40% by weight of polyvinylidene fluoride having a weight-average molecular weight of 290000, followed by further mixing by a Henschel mixer. The resulting mixture was further melt kneaded by a 35 mmφ twin-screw extruder to prepare pellets. The pellets were continuously introduced into a 30 mmφ twin-screw extruder and extruded from a circular ring nozzle attached at the tip of the extruder at 230° C. while supplying air into the hollow portion, followed by melt extruding into a water bath of 40° C. at a spinning speed of 10 m/min after travelling about 20 cm through the air, thereby cooling and solidifying the extruded product to obtain hollow fibers. In the same manner as in Example 1, the hollow fibers were taken off at a speed of 10 m/min by a pair of first infinite track type belt take-off machines, passed through the first heating bath (0.8 m in length) adjusted to a space temperature of 40° C., and further taken off at a speed of 20 m/min by second infinite track type belt take-off machines similar to the first infinite track type belt take-off machines, thereby drawing to 2.0 times. Furthermore, after leaving the second heating bath (0.8 m in length) adjusted to a space temperature of 80° C., the hollow fibers were continuously passed between a pair of rugged rolls with four crests which had a peripheral length of about 0.20 m and were positioned on the water surface of a cooling water bath at a rotational speed of 170 rpm, and thereafter the hollow fibers were taken off at a speed of 15 m/min by the third infinite track type belt take-off machines, thereby shrinking the drawn fiber to 1.5 time, and then the hollow fibers were wound up on a reel of about 3 m in peripheral length. The shrinkage of the fiber length with respect to the increment of the fiber length given by drawing was 0.5. Then, the membranes wound up were dipped in methylene chloride at 30° C. for 1 hour repeatedly 5 times to extract dioctyl phthalate and dibutyl phthalate, followed by drying the membranes. Subsequently, the membranes were dipped in 50 wt % aqueous ethanol solution for 30 minutes, and furthermore transferred to water and dipped therein for 30 minutes to wet the hollow fibers with water. Furthermore, the hollow fibers were dipped twice in a 5 wt % aqueous sodium hydroxide solution at 40° C. for 1 hour. Washing with water by dipping in warm water of 40° C. for 1 hour was carried out 10 times to extract the hydrophobic silica, followed by drying. The resulting hollow fibers were heat-treated at 140° C. for 2 hours in an oven. The amount of silica remaining in the membrane was 0.4% by weight.

The resulting hollow fiber membranes after being subjected to the heat treatment had an outer diameter of 1.90 mm, an inner diameter of 1.05 mm, a porosity of 73%, an average pore diameter of 0.60 µm measured by the half-dry method, a maximum pore diameter of 0.96 µm measured by the bubble point method, a ratio of the maximum pore diameter and the average pore diameter of 1.60, and a pure water permeation rate of 17000 L/(m²·hr). The membranes had a tensile break strength of 12.0 MPa, a tensile break elongation of 145%, a tensile modulus of 50 MPa, a compressive modulus of 3.4 MPa, and an instantaneous compressive strength of 0.7 MPa. It was recognized from a photograph of a section of the membrane that the membrane had a three-dimensional network structure comprising uniform communicating pores, and macrovoids of 8 µm or more were not seen in the inner part of the membrane. The critical surface tension was 54 mN/m and the crimping degree was 1.72.

Example 5

23% by weight of hydrophobic silica having an average primary particle diameter of 0.016 µm and a specific surface area of 110 m²/g, 33.3% by weight of dioctyl phthalate and 3.7% by weight of dibutyl phthalate (SP of a mixed liquid of these two compounds: 18.47 (MPa)$^{1/2}$) were mixed by a Henschel mixer, and to the mixture was added 40% by weight of polyvinylidene fluoride having a weight-average molecular weight of 290000, followed by further mixing by a Henschel mixer.

The resulting mixture was melt kneaded by a 35 mmϕ twin-screw extruder to prepare pellets. The pellets were continuously introduced into a 30 mmϕ twin-screw extruder and extruded from a circular ring nozzle attached at the tip of the extruder at 230° C. while supplying air into the hollow portion, followed by melt extruding into a water bath of 40° C. at a spinning speed of 10 m/min after travelling about 20 cm through the air, thereby cooling and solidifying the extruded product to obtain hollow fibers, which were wound up on a reel as they were. The bundle of the hollow fibers wound up was dipped without cutting in methylene chloride at 30° C. for 1 hour repeatedly 5 times to extract dioctyl phthalate and dibutyl phthalate, followed by drying the bundle. Subsequently, the bundle was dipped in a 50 wt % aqueous ethanol solution for 30 minutes, and furthermore transferred to water and dipped therein for 30 minutes to wet the hollow fibers with water. Furthermore, the bundle was dipped in a 20 wt % aqueous sodium hydroxide solution at 40° C. for 1 hour, and after this was repeated twice, washing with water by dipping in warm water of 40° C. for 1 hour was carried out 10 times to extract the hydrophobic silica, followed by drying to obtain hollow fibers.

The hollow fibers were wound up on a reel and delivered at 10 m/min, and in the same manner as in Example 1 were taken off at a speed of 10 m/min by a pair of first infinite track type belt take-off machines, passed through the first heating bath (0.8 m in length) adjusted to a space temperature of 40° C., and further taken off at a speed of 20 m/min by second infinite track type belt take-off machines similar to the first infinite track type belt take-off machines, thereby drawing the fibers to 2.0 times. Furthermore, after leaving the second heating bath (0.8 m in length) adjusted to a space temperature of 80° C., the hollow fibers were taken off at a speed of 15 m/min by third infinite track type belt take-off machines, thereby shrinking the fibers to 1.5 time, and then wound up on a reel. The shrinkage of the fiber length with respect to the increment of the fiber length given by the drawing was 0.5. The resulting hollow fibers were heat-treated at 100° C. for 1 hour in an oven. The amount of silica remaining in the membrane was 0.7% by weight.

The resulting hollow fiber membranes after being subjected to the heat treatment had an outer diameter of 1.90 mm, an inner diameter of 1.05 mm, a porosity of 73%, an average pore diameter of 0.66 μm measured by the half-dry method, a maximum pore diameter of 1.07 μm measured by the bubble point method, a ratio of the maximum pore diameter and the average pore diameter of 1.62, and a pure water permeation rate of 20000 L/(m$^2$·hr). The membranes had a tensile break strength of 12.2 MPa, a tensile break elongation of 140%, a tensile modulus of 53 MPa, a compressive modulus of 1.6 MPa, and an instantaneous compressive strength of 0.4 MPa. It was recognized from a photograph of a section of the membrane that the membrane had a three-dimensional network structure comprising uniform communicating pores, and macrovoids of 8 μm or more were not seen in the inner part of the membrane. The critical surface tension was 58 mN/m and the crimping degree was 1.43.

Figure 4:
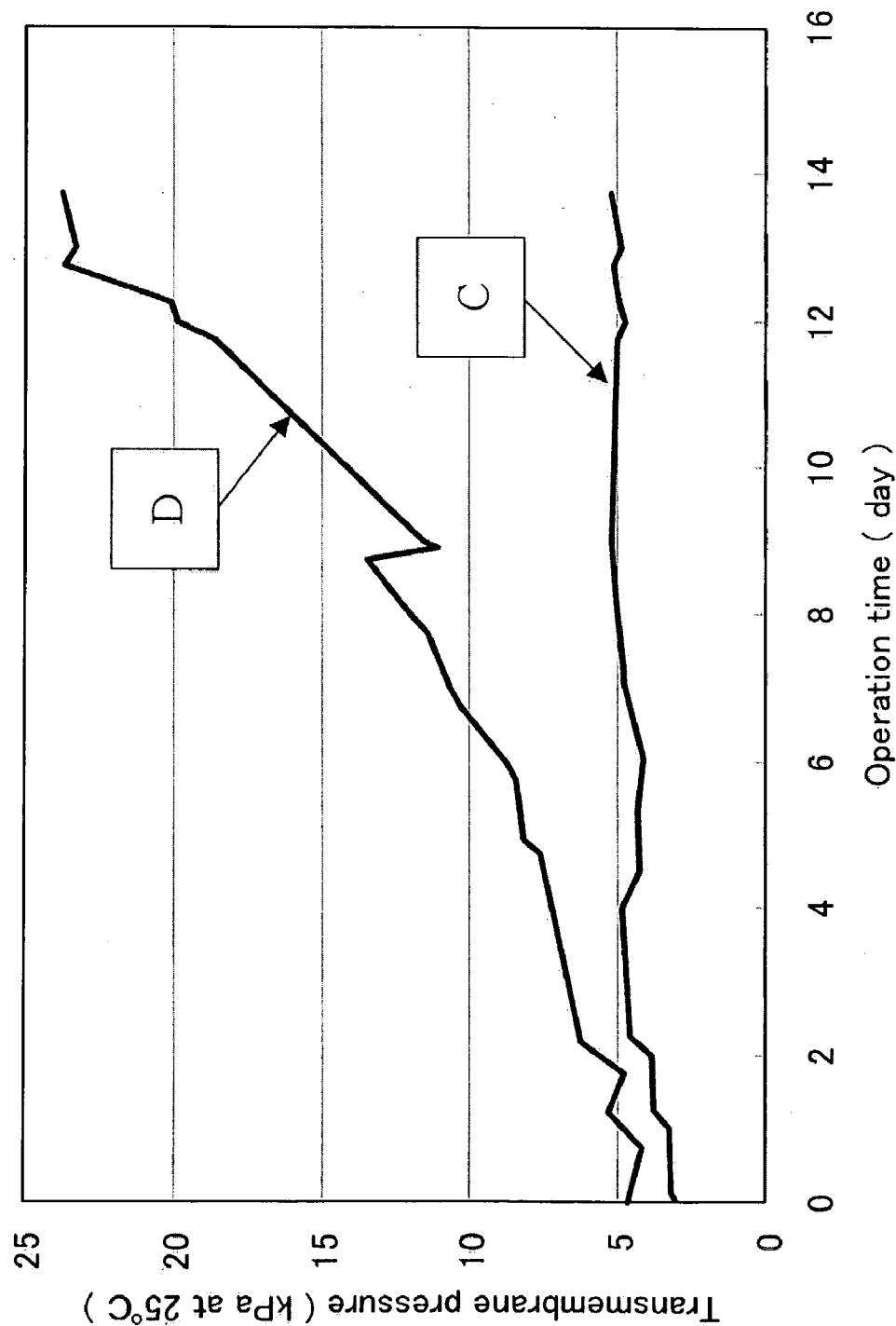
FIG. 4 is a graph which shows the test results on filtration performance for tap water in Example 5 and Comparative Example 2.

A filtration module as shown in FIG. 6 having an effective membrane length of 21 cm and comprising 130 hollow fibers which were sealed to each other at both ends with an epoxy sealing material was made using the hollow fiber membranes after being subjected to the heat treatment. Tap water having a turbidity of 0.03 degree (measured by purified water turbidimeter-Nigoriban ST-BM manufactured Suido Kiko Co., Ltd.) and a residual chlorine content of 0.2–0.3 ppm was filtered through the outer surface side of the hollow fibers, and filtered water was obtained from the inner surface side. The filtration was carried out for 29.5 minutes at a preset Flux of 5.0 m/day, followed by carrying out back washing at a back washing flow rate of 6.0 m/day for 30 seconds. As a result of continuing this cycle, the module could be operated for more than 10 days at a stable transmembrane pressure (FIG. 4, C).

Example 6

25% by weight of hydrophobic silica having an average primary particle diameter of 0.016 μm and a specific surface area of 110 m$^2$/g, 28.0% by weight of dioctyl phthalate and 7.0% by weight of dibutyl phthalate (SP of a mixed liquid of these two compounds: 18.66 (MPa)$^{1/2}$) were mixed by a Henschel mixer, and to the mixture was added 40% by weight of polyvinylidene fluoride having a weight-average molecular weight of 290000, followed by further mixing by a Henschel mixer.

The resulting mixture was melt kneaded by a 48 mmϕ twin-screw extruder to prepare pellets. The pellets were continuously introduced into a 30 mmϕ twin-screw extruder and extruded from a circular ring nozzle attached at the tip of the extruder at 200° C. while supplying nitrogen gas into the hollow portion, followed by melt extruding into a water bath of 40° C. at a spinning speed of 2 m/min after travelling about 20 cm through the air, thereby cooling and solidifying the extruded product to obtain hollow fibers, which were wound up on a reel. A bundle of the hollow fibers wound up was dipped, without cutting, in methylene chloride at 30° C. for 1 hour repeatedly 5 times to extract dioctyl phthalate and dibutyl phthalate, followed by drying the bundle. Subsequently, the bundle was dipped in a 50 wt % aqueous ethanol solution for 30 minutes, and furthermore transferred to water and dipped therein for 30 minutes to wet the hollow fibers with water. Furthermore, the bundle was dipped in a 5 wt % aqueous sodium hydroxide solution at 40° C. for 1 hour, and washing with water by dipping in warm water of 40° C. for 1 hour was carried out 10 times to extract the hydrophobic silica, followed by drying to obtain hollow fibers.

The hollow fibers were wound up on a reel and delivered at 2 m/min, and, in the same manner as in Example 1, were taken off at a speed of 2 m/min by a pair of the first infinite track type belt take-off machines, passed through the first heating bath (0.8 m in length) adjusted to a space temperature of 40° C., and further taken off at a speed of 4 m/min by the second infinite track type belt take-off machines similar to the first infinite track type belt take-off machines, thereby drawing the fibers to 2.0 times. Furthermore, after leaving the second heating bath (0.8 m in length) adjusted to a space temperature of 80° C., the hollow fibers were taken off at a speed of 3 m/min by the third infinite track type belt take-off machines, thereby shrinking the drawn fibers to 1.5 times, and then wound up on a reel. The shrinkage of the fiber length with respect to the increment of the fiber length given by the drawing was 0.5. The resulting hollow fibers were heat-treated at 100° C. for 1 hour in an oven. The amount of silica remaining in the membrane was 1.0% by weight.

The resulting hollow fiber membranes after being subjected to the heat treatment had an outer diameter of 3.67 mm, an inner diameter of 2.42 mm, a porosity of 67%, an average pore diameter of 0.29 μm measured by the half-dry method, a maximum pore diameter of 0.46 μm measured by the bubble point method, a ratio of the maximum pore diameter and the average pore diameter of 1.59, and a pure water permeation rate of 2700 L/(m²·hr). The membranes had a tensile break strength of 7.3 MPa, a tensile break elongation of 80%, a tensile modulus of 19 MPa, a compressive modulus of 1.5 MPa, and an instantaneous compressive strength of 0.3 MPa. It was recognized from a photograph of a section of the membrane that the membrane had a three-dimensional network structure comprising uniform communicating pores, and macrovoids of 8 µm or more were not seen in the inner part of the membrane. The critical surface tension was 54 mN/m and the crimping degree was 1.41.

Example 7

3 Parts by weight of an ethylene-vinyl alcohol copolymer (SOANOL ET3803 having an ethylene content of 38 mol % manufactured by Japan Synthetic Chemical Industry Co., Ltd.) was dissolved in 100 parts by weight of a mixed solvent comprising 50% by weight of water and 50% by weight of isopropyl alcohol by mixing them with heating. A bundle of 100 hollow fiber membranes after being subjected to the heat treatment which were obtained in Example 2 and which had a length of 150 cm and were open at both ends was completely dipped in the above obtained ethylene-vinyl alcohol copolymer solution (68° C.) for 5 minutes. The bundle of hollow fiber membranes taken out of the solution was air dried at room temperature for 30 minutes, and then dried at 60° C. for 1 hour in an oven to obtain polyvinylidene fluoride hollow fiber membranes coated with the ethylene-vinyl alcohol copolymer.

The resulting polyvinylidene fluoride hollow fiber membranes coated with the ethylene-vinyl alcohol copolymer had an outer diameter of 1.22 mm, an inner diameter of 0.66 mm, a porosity of 70%, an average pore diameter of 0.27 µm measured by the half-dry method, a maximum pore diameter of 0.35 µm measured by the bubble point method, a ratio of the maximum pore diameter and the average pore diameter of 1.30, and a pure water permeation rate of 3000 L/(m²·hr). The membranes had a tensile break strength of 11.0 MPa, a tensile break elongation of 100%, a tensile modulus of 49 MPa, a compressive modulus of 5.3 MPa, and an instantaneous compressive strength of 0.9 MPa. The critical surface tension was 70 mN/m and the crimping degree was 1.74. The coating amount was 2.6% by weight.

The water permeation performance retention rate in filtration of suspension water was 25%.

Example 8

A bundle of 100 hollow fiber membranes after being subjected to the heat treatment obtained in Example 5 and which had a length of 150 cm and was open at both ends was completely dipped in the ethylene-vinyl alcohol copolymer solution obtained in the same manner as in Example 7 for 5 minutes. The bundle of hollow fiber membranes taken out of the solution was air-dried at room temperature for 30 minutes, and then dried at 60° C. for 1 hour in an oven to obtain polyvinylidene fluoride hollow fiber membranes coated with the ethylene-vinyl alcohol copolymer.

The resulting polyvinylidene fluoride hollow fiber membranes coated with the ethylene-vinyl alcohol copolymer had an outer diameter of 1.90 mm, an inner diameter of 1.05 mm, a porosity of 72%, an average pore diameter of 0.58 µm measured by the half-dry method, a maximum pore diameter of 0.95 µm measured by the bubble point method, a ratio of the maximum pore diameter and the average pore diameter of 1.64, and a pure water permeation rate of 16000 L/(m²·hr). The membranes had a tensile break strength of 13.7 MPa, a tensile break elongation of 120%, a tensile modulus of 61 MPa, a compressive modulus of 1.9 MPa, and an instantaneous compressive strength of 0.4 MPa. The critical surface tension was 70 mN/m and the crimping degree was 1.43. The coating amount was 5.7% by weight.

Comparative Example 1

In Example 3, after the hollow fibers were taken off at a speed of 20 m/min by the first take-off machines, the hollow fibers were wound on a reel without drawing, and subjected to the same extraction and drying as in Example 3. The amount of silica remaining in the membranes was 0.5% by weight.

The resulting hollow fiber membranes had an outer diameter of 1.27 mm, an inner diameter of 0.67 mm, a porosity of 66%, an average pore diameter of 0.20 µm measured by the half-dry method, a maximum pore diameter of 0.25 µm measured by the bubble point method, a ratio of the maximum pore diameter and the average pore diameter of 1.25, and a pure water permeation rate of 2000 L/(m²·hr). The membranes had a tensile break strength of 7.0 MPa, a tensile break elongation of 220%, a tensile modulus of 90 MPa, a compressive modulus of 9.2 MPa, and an instantaneous compressive strength of 1.6 MPa. It was recognized from a photograph of a section of the membrane that the membrane had a three-dimensional network structure comprising uniform communicating pores, and macrovoids of 8 µm or more were not seen in the inner part of the membranes. The critical surface tension was 52 mN/m and the crimping degree was 1.44.

The water permeation performance retention rate in filtration of suspension water was 14%.

A module was made using the above hollow fiber membranes in the same manner as in Example 1, and filtration, back washing and air scrubbing were carried out in the same manner as in Example 1. As a result of continuing this cycle, the transmembrane pressure sharply increased to 0.2 MPa in about 6 days (0–170 hours). This module was washed with chemicals by dipping it in a mixed solution comprising 5000 ppm of sodium hypochlorite and 2% by weight of sodium hydroxide for 6 hours, followed by washing with water until the pH reached neutrality, and furthermore the module was washed with chemicals by dipping it in a mixed solution comprising 2% by weight of nitric acid and 2% by weight of oxalic acid for 2 hours, followed by washing with water until the pH reached neutrality, thereby obtaining a module having a water permeation amount in nearly the same state as in the initial stage. Using this module, the cycle was restarted at a preset Flux of 2.7 m/day in the same manner as above. As a result, the transmembrane pressure again increased in about 6 days and reached the upper limit 0.3 MPa, and the operation became impossible (170–340 hours). This module was again washed with chemicals in the same manner as above to obtain a module in the initial state. When the operation was carried out by decreasing the preset Flux to 2.4 m/day, a stable operation could finally be performed (340–500 hours) (FIG. 3, B).

Comparative Example 2

Hollow fiber membranes were obtained in the same manner as in Example 5, except that the steps of drawing, shrinking and heat-treating were not carried out. The amount of silica remaining in the membrane was 0.7% by weight.

The resulting hollow fiber membranes had an outer diameter of 1.98 mm, an inner diameter of 1.09 mm, a porosity of 66%, an average pore diameter of 0.47 µm measured by the half-dry method, a maximum pore diameter of 0.76 µm measured by the bubble point method, a ratio of the maximum pore diameter and the average pore diameter of 1.62, and a pure water permeation rate of 7900 L/(m²·hr). The membranes had a tensile break strength of 10.7 MPa, a tensile break elongation of 280%, a tensile modulus of 129 MPa, a compressive modulus of 6.8 MPa, and an instantaneous compressive strength of 1.2 MPa. It was recognized from a photograph of a section of the membrane that the membrane had a three-dimensional network structure comprising uniform communicating pores, and macrovoids of 8 µm or more were not seen in the inner part of the membrane. The critical surface tension thereof was 58 mN/m and the crimping degree was 1.43.

A module was prepared using the above hollow fiber membranes in the same manner as in Example 5, and filtration was carried out for 29.5 minutes at a preset Flux of 5.0 m/day, and then back washing was carried out at a back washing flow rate of 6.0 m/day for 30 seconds. As a result of continuing this cycle, the transmembrane pressure increased from about the 5th day, and a stable operation could not be performed, a result that was different from the case of using the module of Example 5 (FIG. 4, D).

Comparative Example 3

Hollow fiber membranes were obtained in the same manner as in Example 6, except that the steps of drawing, shrinking and heat-treating were not carried out. The amount of silica remaining in the membrane was 1.0% by weight.

The resulting hollow fiber membranes had an outer diameter of 3.77 mm, an inner diameter of 2.48 mm, a porosity of 57%, an average pore diameter of 0.20 µm measured by the half-dry method, a maximum pore diameter of 0.28 µm measured by the bubble point method, a ratio of the maximum pore diameter and the average pore diameter of 1.40, and a pure water permeation rate of 700 L/(m²·hr). The membranes had a tensile break strength of 6.5 MPa, a tensile break elongation of 150%, a tensile modulus of 55 MPa, a compressive modulus of 6.6 MPa, and an instantaneous compressive strength of 1.0 MPa. It was recognized from a photograph of a section of the membrane that the membrane had a three-dimensional network structure comprising uniform communicating pores, and macrovoids of 8 µm or more were not seen in the inner part of the membrane. The critical surface tension thereof was 54 mN/m and the crimping degree was 1.41.

INDUSTRIAL APPLICABILITY

The novel hollow fiber membranes obtained by the method of the present invention have dense pores and have a high water permeation performance and a proper tensile modulus. Therefore, when a module is made from the hollow fiber membranes of the present invention, the module has a high endurance and a high stain resistance, and furthermore can be provided with a higher stain resistance by coating it with a hydrophilic material. Moreover, according to the present invention, hollow fiber membranes having these characteristics can be produced stably with no defects.

As mentioned above, since the hollow fiber membranes produced by the method of the present invention are hollow fiber filter membranes high in filtration flow rate, low in reduction of the filtration flow rate during use, and, furthermore, high in resistance against breaking, they can be very suitably used in the fields of filtration such as removal of turbidity of water.

The invention claimed is:

1. A method for producing hollow fiber membranes having a round cross section, which comprises steps of:
   melt kneading a mixture comprising polyvinylidene fluoride and an organic liquid or a mixture comprising polyvinylidene fluoride, an organic liquid and an inorganic fine powder;
   extruding the kneaded mixture to form hollow fibers; and
   extracting the organic liquid or the organic liquid and the inorganic fine powder from the hollow fibers,
   wherein the method includes the steps of drawing the hollow fibers before termination of the extraction or after termination of the extraction and then shrinking the fibers,
   wherein the drawing is carried out by take-off machines each comprising a pair of opposed infinite track type belts of which each outer surface is made of an elastic material, one of said machine provided on an upstream side of the drawing and the other provided on a downstream side of the drawing, and
   wherein the hollow fibers are interposed between said opposed infinite track type belts and both the belts are moved at the same speed in the same direction to straightly carry the fibers in each of the take-off machines, and fiber carrying speed in the take-off machine on the downstream side is faster than the fiber carrying speed in the take-off machine on the upstream side, and
   wherein the shrinking is carried out by take-off machines each comprising a pair of opposed infinite track type belts of which each outer surface is made of an elastic material, one of said machine provided on an upstream side of the shrinking and the other provided on a downstream side of the shrinking, wherein the hollow fibers are interposed between said opposed infinite track type belts and both the belts are moved at the same speed in the same direction to straightly carry the fibers in each of the take-off machines, and fiber carrying speed in the take-off machine on the downstream side is slower than the fiber carrying speed in the take-off machine on the upstream side.

2. A method according to claim 1, which includes the steps of drawing the hollow fibers before termination of the extraction and then shrinking the fibers.

3. A method according to claim 1, wherein the hollow fibers after drawing are shrunk so that the shrinkage of fiber length with respect to the increment of fiber length given by the drawing is in the range of not less than 0.3 and not more than 0.9.

4. A method according to claim 1, wherein the hollow fibers are subjected to a heat treatment at not lower than 100° C. and not higher than 160° C. after the steps of drawing and subsequent shrinking.

5. A method according to claim 1, wherein the mixture comprises polyvinylidene fluoride, an organic liquid and an inorganic fine powder.

6. A method according to claim 5, wherein the steps of drawing and then shrinking are carried out before the extraction of the organic liquid and before the extraction of the inorganic fine powder.

7. A method according to claim 5, wherein the steps of drawing and then shrinking are carried out after the extraction of the organic liquid and before the extraction of the inorganic fine powder.

8. A method according to claim 1, wherein the hollow fibers are crimped during the shrinking step.

9. A method according to claim 1, which includes the step of impregnating the hollow fibers after termination of the extraction with an ethylene-vinyl alcohol copolymer solution containing an ethylene-vinyl alcohol copolymer and a solvent which is inert to polyvinylidene fluoride and dissolves the ethylene-vinyl alcohol copolymer and the step of drying the hollow fibers to remove the solvent therefrom.

10. A method according to claim 1, wherein the hollow fibers after drawing are shrunk so that shrinkage of fiber length with respect to increment of fiber length given by the drawing is in a range of not less than 0.50 and not more than 0.85.

* * * * *